US011481026B2

(12) United States Patent
Chhabra et al.

(10) Patent No.: US 11,481,026 B2
(45) Date of Patent: Oct. 25, 2022

(54) IMMERSIVE DEVICE AND METHOD FOR STREAMING OF IMMERSIVE MEDIA

(71) Applicant: Samsung Electronics Co., Ltd., Suwon-si (KR)

(72) Inventors: Aneet Kaur Chhabra, Noida (IN); Rahul Aggarwal, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 16/991,414

(22) Filed: Aug. 12, 2020

(65) Prior Publication Data
US 2021/0055787 A1 Feb. 25, 2021

(30) Foreign Application Priority Data
Aug. 22, 2019 (IN) .............................. 201941033921

(51) Int. Cl.
*G06F 3/01* (2006.01)
*G06F 3/0346* (2013.01)
(Continued)

(52) U.S. Cl.
CPC ......... *G06F 3/012* (2013.01); *G02B 27/0093* (2013.01); *G02B 27/0101* (2013.01);
(Continued)

(58) Field of Classification Search
None
See application file for complete search history.

(56) References Cited

U.S. PATENT DOCUMENTS

| 9,898,819 B2 | 2/2018 | Jeon et al. |
| 10,281,978 B2 | 5/2019 | Lavalle et al. |

(Continued)

FOREIGN PATENT DOCUMENTS

| EP | 3 406 310 A1 | 11/2018 |
| EP | 3 668 092 A1 | 6/2020 |

(Continued)

OTHER PUBLICATIONS

Indian Office Action dated Oct. 8, 2021, issued in Indian Patent Application No. 201941033921.
(Continued)

*Primary Examiner* — Hilina K Demeter
(74) *Attorney, Agent, or Firm* — Jefferson IP Law, LLP

(57) ABSTRACT

An immersive device and method for streaming of immersive media are provided. The method includes receiving body motion coordinates of a user in each of three dimensions and determining deviation in the body motion by a first immersive device. A dominant direction of motion based on the deviation calculated is then determined. A request by the first immersive device for at least one media frame to be displayed is received by a second immersive device. The received request is processed by the second immersive device and the media frame to be displayed is segmented into a plurality of tiles by the second immersive device. One tile with the first pixel density and a remainder of the tiles of the plurality of tiles with a second pixel density are stitched by the second immersive device to render one immersive media frame which is displayed to the user.

20 Claims, 21 Drawing Sheets

(51) Int. Cl.
  *G02B 27/00* (2006.01)
  *G02B 27/01* (2006.01)
  *G06T 7/11* (2017.01)

(52) U.S. Cl.
  CPC ..... *G02B 27/0172* (2013.01); *G02B 27/0179* (2013.01); *G06F 3/0346* (2013.01); *G06T 7/11* (2017.01); *G02B 2027/0123* (2013.01); *G02B 2027/0187* (2013.01); *G06T 2207/20104* (2013.01)

(56) References Cited

U.S. PATENT DOCUMENTS

| | | |
|---|---|---|
| 10,848,837 B2 | 11/2020 | Yun et al. |
| 2013/0141526 A1 | 6/2013 | Banta et al. |
| 2016/0267713 A1 | 9/2016 | Patel |
| 2017/0195658 A1 | 7/2017 | Jung |
| 2017/0237964 A1 | 8/2017 | Maenpaa |
| 2017/0289219 A1 | 10/2017 | Khalid et al. |
| 2017/0374341 A1* | 12/2017 | Michail .................. G06T 19/006 |
| 2018/0007422 A1* | 1/2018 | Castleman ............ H04L 65/762 |
| 2018/0077409 A1* | 3/2018 | Heo .................. G02B 27/0093 |
| 2018/0091577 A1 | 3/2018 | Park et al. |
| 2018/0164593 A1* | 6/2018 | Van Der Auwera .... G06F 3/013 |
| 2018/0213202 A1 | 7/2018 | Kopeinigg et al. |
| 2018/0262758 A1* | 9/2018 | El-Ghoroury ........ H04N 13/344 |
| 2018/0341323 A1 | 11/2018 | Mate et al. |
| 2018/0357780 A1* | 12/2018 | Young ..................... G06T 15/10 |
| 2019/0045222 A1* | 2/2019 | Yip ..................... H04N 21/816 |
| 2019/0102944 A1* | 4/2019 | Han ........................ G06F 3/012 |
| 2019/0174150 A1 | 6/2019 | D'Acunto et al. |
| 2019/0188828 A1 | 6/2019 | Aggarwal et al. |
| 2020/0084516 A1 | 3/2020 | Yun et al. |

FOREIGN PATENT DOCUMENTS

| | | |
|---|---|---|
| JP | 2017-120441 A | 7/2017 |
| KR | 10-2015-0120774 A | 10/2015 |
| KR | 10-2018-0078431 A | 7/2018 |
| KR | 10-2018-0112708 A | 10/2018 |
| KR | 10-1907794 B1 | 12/2018 |
| KR | 10-2019-0063590 A | 6/2019 |
| WO | 2017/202899 A1 | 11/2017 |
| WO | 2018/136301 A1 | 7/2018 |
| WO | 2019/066191 A1 | 4/2019 |

OTHER PUBLICATIONS

International Search Report and written opinion dated Nov. 17, 2020, issued in International Application No. PCT/KR2020/010834.

* cited by examiner

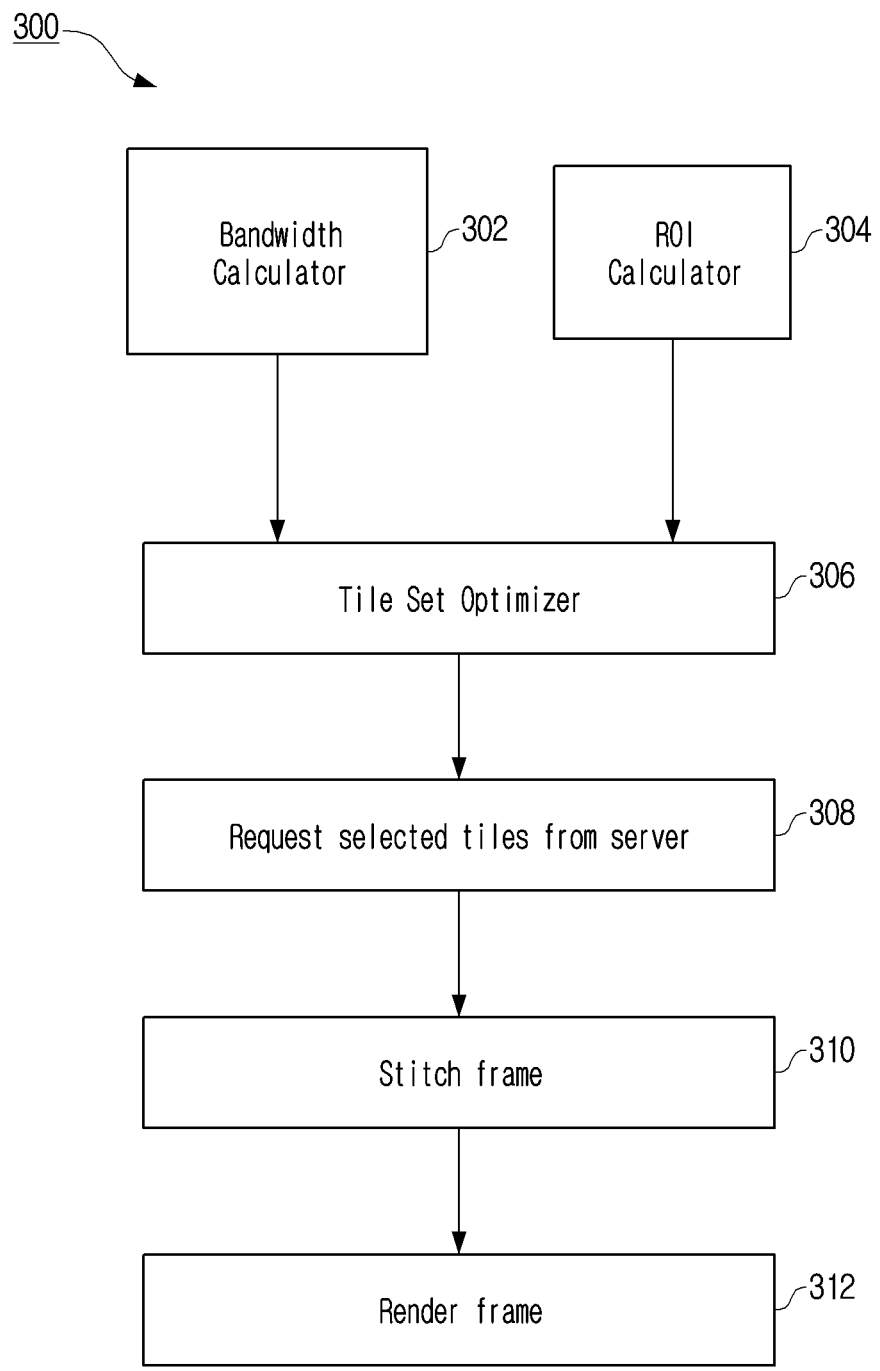

IMMERSIVE DEVICE AND METHOD FOR STREAMING OF IMMERSIVE MEDIA

CROSS-REFERENCE TO RELATED APPLICATION(S)

This application is based on and claims priority under 35 U.S.C. § 119 of an Indian patent application number 201941033921, filed on Aug. 22, 2019, in the Indian Intellectual Property Office, the disclosure of which is incorporated by reference herein in its entirety.

BACKGROUND

1. Field

The disclosure relates to the field of immersive media streaming techniques. More particularly, the disclosure relates to a device and a method for adaptive streaming of immersive media.

2. Description of Related Art

An immersive media or a mixed reality is the merging of real and virtual worlds to produce new environments and visualizations where physical and digital objects co-exist and interact in real time. Mixed reality takes place not only in the physical world or the virtual world, but is a hybrid of reality and virtual reality, encompassing both augmented reality and augmented virtuality via immersive technology. Streaming Virtual Reality (VR) content is becoming increasingly popular. Advances in VR technologies now allow providing users with an immersive experience by live streaming popular events, such as the Super Bowl, in the form of 360-degree videos. Such services are highly interactive and impose substantial load on the network, especially cellular networks with inconsistent link capacities. These omnidirectional or 360 degree videos are currently becoming readily available in the market. They play an important role in providing an immersive experience and have fundamental use in VR and Augmented Reality (AR) based applications. Efficient transmission of bulky omnidirectional video streams to bandwidth-constrained devices is a field of much research. One of the introduced methods to solve this problem is using "Normal VR" technique in which same quality of data is used throughout the frame and to maintain immersive quality, high bandwidth is needed. In some existing methods, the omnidirectional videos to be streamed are divided into tiles, so that each temporal segment is composed of several spatial tiles. Only the tiles belonging to the viewport, the region of the video watched by the user, are streamed at the highest quality. The other tiles are instead streamed at a lower quality. An algorithm is implemented to predict the future viewport position and minimize quality transitions during viewport changes wherein the streamed video is delivered using the server push feature of the Hyper Text Transfer Protocol (HTTP) protocol. But streaming these videos over HTTP imposes an important challenge on today's video delivery infrastructures which calls for dedicated thoroughly designed techniques for mixed reality content generation, delivery, and consumption.

Many conventional systems and methods have been proposed for streaming mixed reality videos in high immersive quality wherein these systems and methods don't have much data on where things are in the real world, but they do have the exact position of user's head. So they render three layers in this order: virtual objects behind the user's head, the real world, and virtual objects in front of the user's head. It's simple but a clever heuristic that work well for many situations. However, this presents certain limitations. First of all, one cannot depict virtual objects as being between the head and another body part in front of the subject, such as a hand. Second, the real layer is treated as a flat plane, so adding lighting or shadows from the virtual world won't look realistic and as such are not typically supported. Also the user's head position can change at any time, but the new high immersive quality data will be downloaded and displayed only after the last downloaded data has been rendered on display. The Region of Interest (ROI) being downloaded at any time is a factor of the Field of View (FOV), which is a static value. If download latency+stitching latency>speed of head motion, the system is always stuck in downloading. The user may end up always watching low quality content. Also the above mentioned systems and methods are not suitable for efficiently calculating ROI of objects having six Degrees of Freedom (DOF) as they are limited to calculating ROI of objects having three DOF.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above mentioned problems and/or disadvantages and to provide at least the advantages described below. Accordingly, an aspect of the disclosure is to provide a dedicated, thoroughly designed, and adaptive system and method for efficient streaming of mixed reality media or at least provide a useful alternative.

Another aspect of the disclosure is to provide a method for streaming of immersive media.

Another aspect of the disclosure is to provide an immersive device which determine a region of interest using a dominance calculation module.

Another aspect of the disclosure is to provide a method for streaming immersive media using server-client interaction.

Another aspect of the disclosure is to provide a method for streaming immersive media in playback of six degree of freedom content.

Another aspect of the disclosure is to provide an immersive device for streaming immersive media.

Another aspect of the disclosure is to provide a method for determining user focus area.

Another aspect of the disclosure is to provide a method for Field of View (FOV) mapping.

Additional aspects will be set forth in part in the description which follows and, in part, will be apparent from the description, or may be learned by practice of the presented embodiments.

In accordance with an aspect of the disclosure, a method for streaming immersive media is provided. The method includes receiving by an immersive device, one media frame in a first pixel density corresponding to a field of view of the immersive device, segmenting one media frame into a plurality of tiles, detecting, one tile by the immersive device from the plurality of tiles, comprising at least one region of interest, sending, a request by the immersive device to share at least one tile in a second pixel density based on a bandwidth of the immersive device, the second pixel density being higher than the first pixel density, receiving, by the immersive device, at least one tile in the second pixel density and lastly rendering, by the immersive device, at least one media frame comprising at least one tile in the second pixel density and the remaining tiles in the first pixel density in the field of view of the immersive device.

According to some embodiments of the disclosure, a dominance calculation module is incorporated in which direction of dominance is calculated using one or more motion parameters thereby deciding the region of interest for user.

In accordance with another aspect of the disclosure, a method for streaming immersive media using server-client interaction is provided. The method includes receiving, by a server, body motion coordinates of the user and information indicative of the field of view of an electronic device, determining, by the server, a deviation in coordinates of the user in each of three dimensions, determining, by the server, a dominant direction of motion based on the deviation, dynamically determining, by the server, a region of interest based on the dominant direction of motion within each of a plurality of media frames, generating, by the server, at least one optimized media frame based on the region of interest, stitching the at least one optimized frame in the region of interest in the plurality of media frames and lastly transmitting the plurality of media frames stitched with the at least one optimized media frame to the electronic device.

In accordance with another aspect of the disclosure, a method for streaming immersive media in playback of six degree of freedom content is provided. The method includes requesting, a Media Presentation Description (MPD) file to a server by the client, downloading the MPD for playback of six (6) Degree(s) of Freedom (DOF) content by the server, detecting the change in client body and head motion in playback of the 6 DOF content by the server, calculating bandwidth of the client, FOV using a 6 DOF FOV calculator based on change in the body motion and the type of motion using 6 DOF motion calculator, calculating the coordinates of the different viewpoints covered by the client during change in its body motion, calculating the coordinates of an extended ROI rectangle for each viewpoint, enabling multidimensional media buffering pipeline mechanism to download the data of multiple viewpoints depending upon the client body motion, determining the optimal set of tiles falling within the ROI of each viewpoint using an Spatial Representation Description (SRD) information of the MPD file supplied from server and extracting HTTP URLS for respective tiles and lastly requesting the server by the client to provide suitable tile set for providing streaming of immersive media in playback of 6 DOF content.

In accordance with another aspect of the disclosure, an immersive device for streaming immersive media is provided. The immersive device includes a head motion tracker to detect the head motion of the client and demonstrating whether the head motion of the client is static, linear or fast, a dynamic ROI generator module determining an increase or decrease in the ROI of the client with respect to the FOV based on clients motion, a tile selection module for determining and requesting the best possible tile set as per calculated ROI and demonstration of client motion, a server receiving a requested tile set and returning the requested tile set, a rendering module receiving this requested tile set and combining first pixel density ROI region and second pixel density base to provide a final first pixel density resolution frame as output and lastly an output device receiving the final second pixel density resolution frame. The first pixel density herein refers to "high quality" and the second pixel density refers to "low quality".

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates the operation of a tile set optimizer to provide adaptive streaming of immersive media, according to an embodiment of the disclosure;

Throughout the drawings, it should be noted that like reference numbers are used to depict the same or similar elements, features, and structures.

DETAILED DESCRIPTION

Figure 1A:
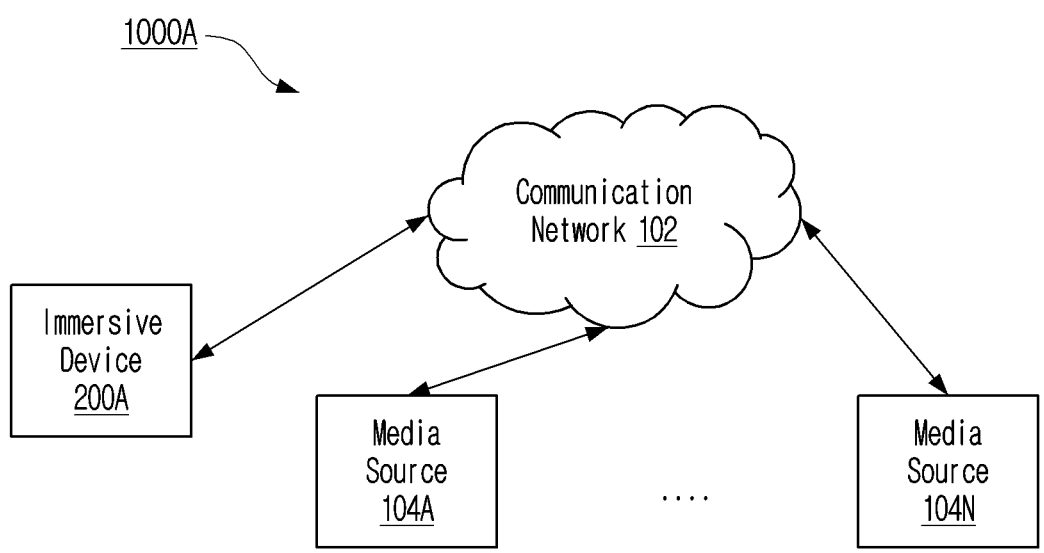
FIG. 1A illustrates a block diagram of an immersive environment involving interaction of an immersive device with various other devices, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. As used herein, the term "and/or" includes any and all combinations of one or more of the associated listed items. Expressions such as "at least one of," when preceding a list of elements, modify the entire list of elements and do not modify the individual elements of the list. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units, engines or modules or the like, are physically implemented by electronic devices such as mobile, laptop, mini-tablets, or the like, and may optionally be driven by firmware and software. The modules/engines may, for example, be embodied in one or more electronic devices, or on any other communication devices and the like. The modules constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Like numbers refer to like elements throughout. Thus, the same or similar numbers may be described with reference to other drawings even if they are neither mentioned nor described in the corresponding drawing. Also, elements that are not denoted by reference numbers may be described with reference to other drawings. Although the terms first, second, etc. may be used herein to describe various elements, these elements should not be limited by these terms. These terms are generally only used to distinguish one element from another.

Accordingly, embodiments herein disclose a method for adaptive streaming of mixed reality media. The method includes calculating ROI of an object comprising detecting head motion and body motion of the client for calculation of the client FOV of suitable depth, width and height, calculating the dominant factor based on the head motion or the body motion more prominent in the client behavior; and outputting new dimensions for the client FOV depending upon the calculated dominant factor. If the head movement is prominent the predefined minimum and maximum value of the client FOV is fetched, the depth of the client FOV is assigned minimum value and the width and the height of the client FOV is clipped to maximum value. Further, if the body movement is prominent: the predefined minimum and maximum value of the client FOV is fetched, the minimum value is assigned to the width and the height of the client FOV and the depth of the client FOV is clipped to maximum value.

Unlike conventional methods and systems, the proposed method utilizes best resolution in ROI and also makes the dimension of ROI dynamic depending on the user motion. As Augmented reality augment virtual object is based on user ROI, the proposed method can be easily extended for augmented reality and virtual reality or both mixed scenarios as well, as augmented reality environment can be easily cluttered with lot of virtual objects if it's just statically based on user FOV, which will lead to unnecessary load on system to show graphical object. The proposed method can calculate the user effective dynamic ROI based on the its motion, and help to only augment object which is relevant based on the user motion.

In the proposed systems and methods, the efficient use of bandwidth is targeted in 3 DOF and 6 DOF scenarios. The proposed method reduces the latency problem of 6 DOF by downloading the multi-view point data in case of user movement and as it uses a tiling technique bandwidth requirement as this solution which is way lesser than traditional approach. The method can be used to automatically switch to 3 DOF version of solution in case system does not detect any translational motion from user, which again improves user experience and further enhances it in an effective manner.

Referring now to the drawings and more particularly to FIGS. 1A through 17, there are shown embodiments of the disclosure.

FIG. 1A is a block diagram of an immersive environment 1000A involving interaction of an immersive device 200A with various other devices, according to an embodiment of the disclosure.

Referring to FIG. 1A, the immersive environment 1000A comprises of the immersive device 200A connected to media sources 104A-104N (hereinafter media sources 104) over a communication network 102 wherein these media sources can be remote servers, personal computers, laptops, mobiles or PDA's (Personal Digital Assistants) and other remote devices.

Figure 1B:
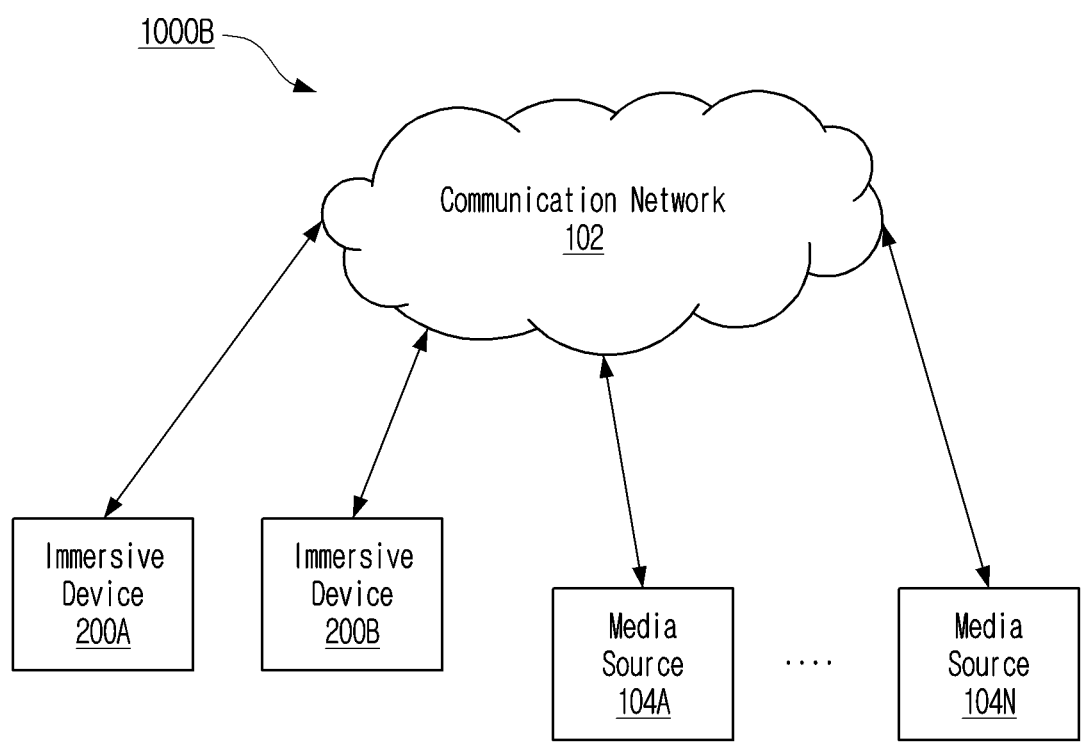
FIG. 1B illustrates a block diagram of an immersive environment involving interaction between various devices, according to an embodiment of the disclosure.

FIG. 1B illustrates a block diagram of an immersive environment 1000B involving interaction between various devices, according to an embodiment of the disclosure.

Referring to FIG. 1B, the immersive environment mainly comprises of the immersive device 200A (first immersive device 200A) connected to a second immersive device 200B and media sources 104 over the communication network 102 wherein these media sources can be remote servers, personal computers, laptops, mobiles or PDA's (Personal Digital Assistants) and other remote devices. The second immersive device 106 can also be a remote server, a personal computer, a laptop, a mobile or a PDA or any other remote device.

The communication network 102 can include a data network such as, but not restricted to, the Internet, local area network (LAN), wide area network (WAN), metropolitan area network (MAN) etc. In certain embodiments, the communication network can include a wireless network, such as, but not restricted to, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS) etc.

Figure 2A:
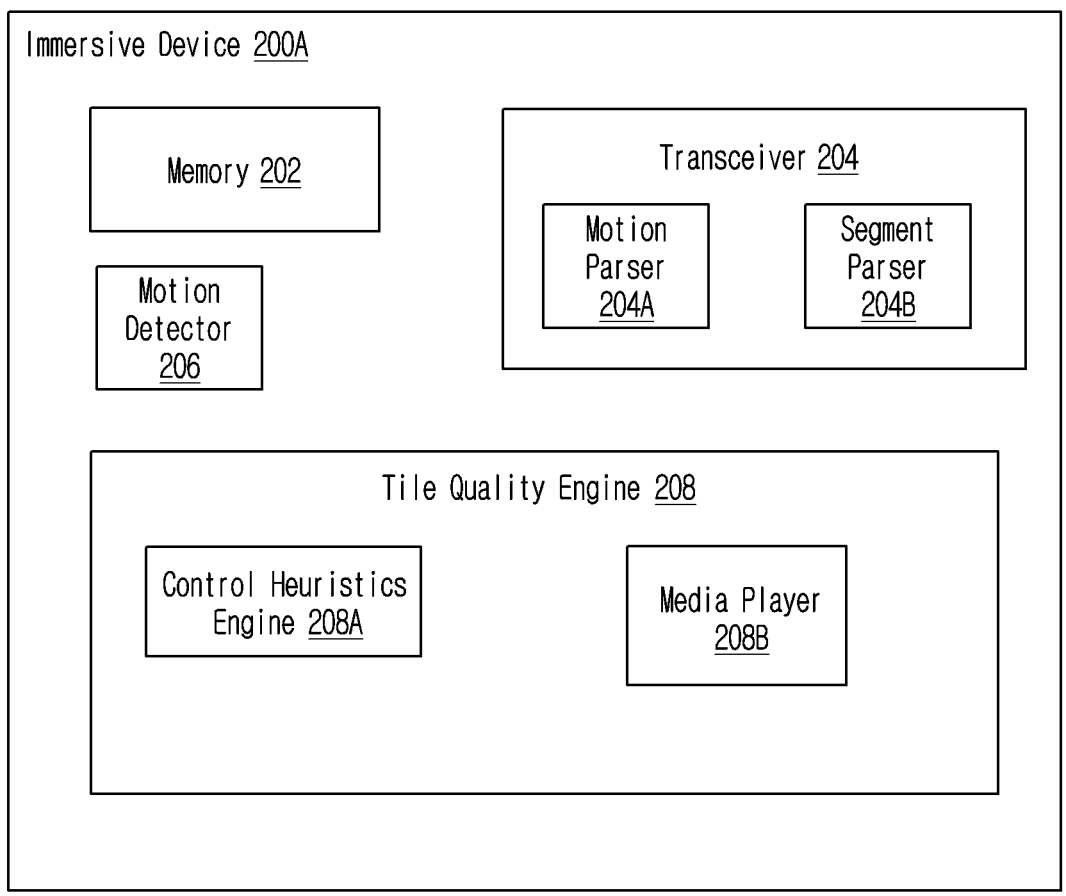
FIG. 2A illustrates hardware components of an immersive device, according to an embodiment of the disclosure.

FIG. 2A illustrates hardware blocks of the first immersive device 200A, according to an embodiment of the disclosure.

Referring to FIG. 2A, the first immersive device 200A comprises of a memory 202, a transceiver 204 having a media parser 204A and a segment parser 204B, and a tile quality engine 208 having a control heuristics engine 208A and a media player 208B to stitch high quality tiles among low quality tiles. The control heuristics engine 208A can further include three types a bandwidth calculator (not shown) to calculate the bandwidth, an FOV calculator (not shown) to calculate FOV of an object and motion calculator (not shown) to calculate the motion type and direction of the motion of the object. The immersive device 200A further includes a motion detector 206 that determines the coordinates of a user of the immersive device 200A based on the rotational and/or translational motion of the user.

The transceiver 212 receives information indicative of at least one immersive media frame from the media sources 104. The media parser 212A and segment parser 212B determines locations of various tiles in the at least one immersive media frame. This information is sent to the tile quality engine 208 along with any deviation in motion coordinates of the user as determined by the motion detector 206. Tile locations comprising at least one region of interest are determined based on the deviation of motion coordinates. The tile locations are sent as a request to the media sources 104 using the transceiver 204. Accordingly, tiles within the determined region of interest are received from the media sources 104 in a first pixel density and other tiles of the immersive media frame are received from the media sources 104 in a second pixel density. The first pixel density is higher than the second pixel density. The tiles of varying pixel density are further stitched and rendered as an immersive media by the media player 208B that is further displayed to the user.

Figure 2B:
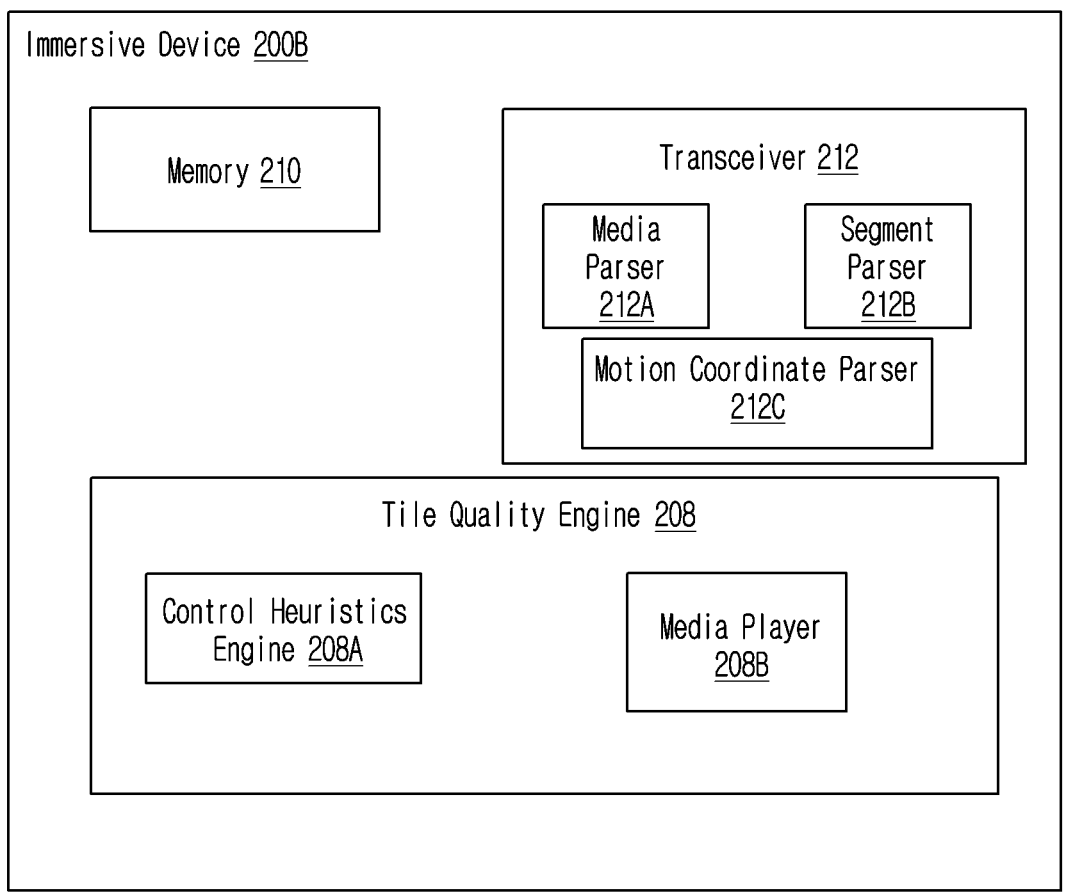
FIG. 2B illustrates hardware components of an immersive device, according to an embodiment of the disclosure.

FIG. 2B illustrates a block diagram of the second immersive device 200B, according to an embodiment of the disclosure.

Referring to FIG. 2B, the second immersive device 200B is connected to the first immersive device through the communication network 102. The second immersive device 200B comprises of a memory 210, a transceiver 212 having a media parser 212A, a segment parser 212B and a motion coordinate parser 212C, and the tile quality engine 208 having the control heuristics engine 208A and the media player 208B to display the media received as output at client's end. The control heuristics engine 208A can further include a bandwidth calculator to calculate the bandwidth, an FOV calculator to calculate FOV of an object and motion calculator to calculate the motion type and direction of the motion of the object.

The transceiver 212 receives information indicative of at least one immersive media frame from the media sources 104. The media parser 212A and segment parser 212B determines locations of various tiles in the at least one immersive media frame. The transceiver 212 further receives motion coordinates of the user of the first immersive device 200A from the motion detector 206 of the immersive device 200A. This information (received by the transceiver 212 is sent to the tile quality engine 208. Tile locations comprising at least one region of interest are determined based on the deviation of motion coordinates. The tile locations are sent as a request to the media sources 104 using the transceiver 204. Accordingly, tiles within the determined region of interest are received from the media sources 104 in a first pixel density and other tiles of the immersive media frame are received from the media sources 104 in a second pixel density.

In an embodiment, the first pixel density is higher than the second pixel density. The first and second pixel density are determined by motion deviation of the user and the communication bandwidth pertaining to communication between the immersive devices 200A and 200B and the media sources 104. The tiles of varying pixel density are further stitched and rendered as an immersive media by the media player 208B. The immersive media is transmitted to the immersive device 200A to be displayed to the user.

In some embodiments, the memory 202 and the memory 210 is coupled to an immersive environment library (not shown) through the media sources 104. In some embodiments, the memory 202 and the memory 210 can have immersive media stored. The immersive environment library is a source for multi-modal content used for extracting information indicative of various immersive environments. Immersive environments include augmented reality (AR) environments, virtual reality (VR) environments, mixed reality environments and the like. The immersive environment library can be but not limited to a relational database, a navigational database, a cloud database, an in-memory database, a distributed database and the like. In some embodiments, the immersive environment library can be stored on the media player 208B and the memory 210. In some other embodiments, the immersive environment library is stored on a remote computer, a server, a network of computers or the Internet.

FIG. 3 illustrates the operation 300 of the tile quality engine 208 to provide adaptive streaming of immersive media in operations 302-312, according to an embodiment of the disclosure.

Referring to FIG. 3, for every tile set, w=width of the tile, h=height of the tile, W=width of the frame, H=height of the frame, BT=total bit-rate of the video, bt=BT/w*h and BW=Available Bandwidth. Given that only a part of the frame is in high quality, the effective bandwidth available to the area in ROI can be BW/2 (Half of the BW is used for the high quality frame, half for the low quality frame) and 2*BW/3 (Two thirds of the BW is used for the high quality frame, one-third for the low quality frame). The parameter for selecting the effective bandwidth can be based on but not limited to: Device capability, Type of video, Size of ROI, etc.

Figure 4:
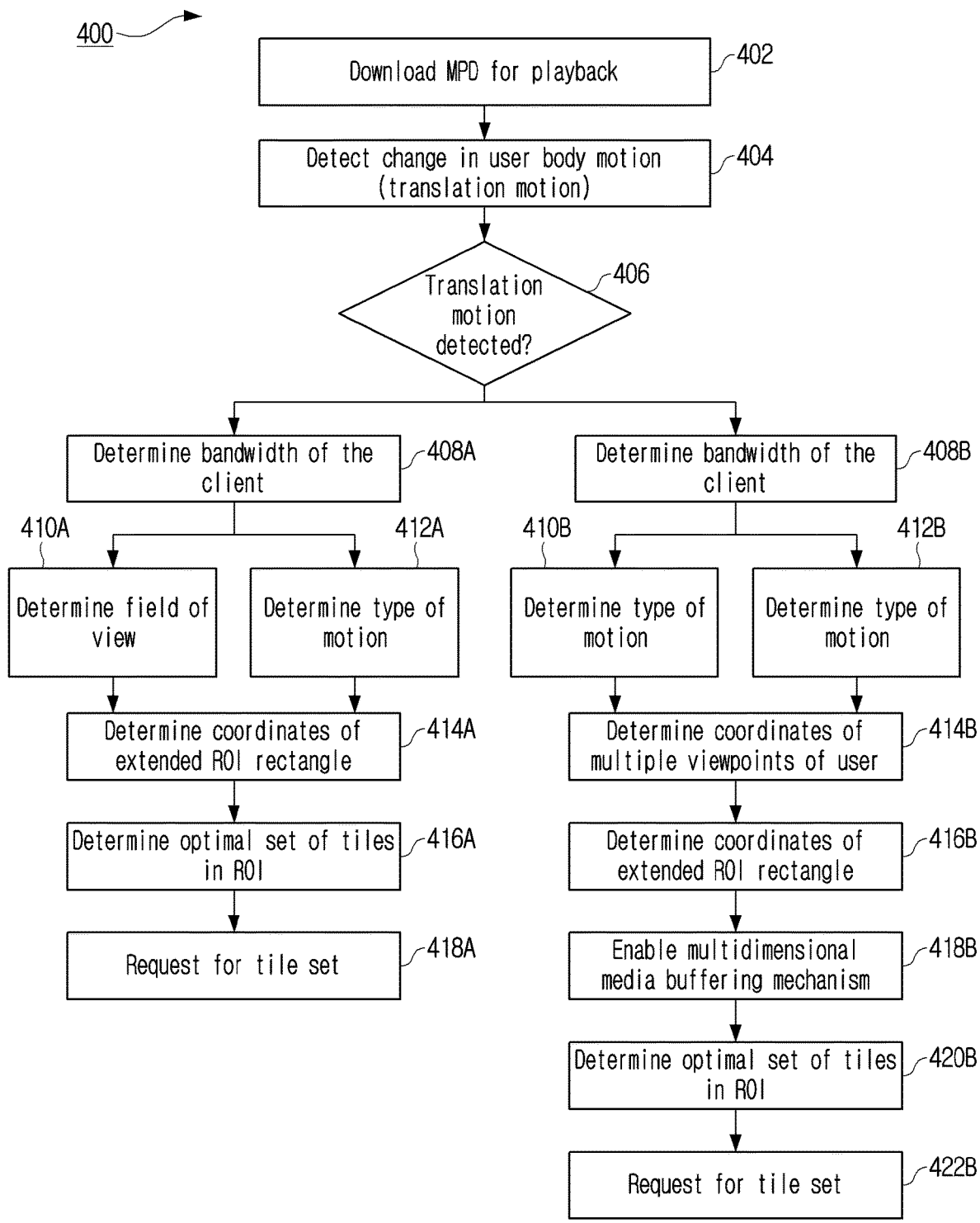
FIG. 4 illustrates a method flowchart for 3 degrees of freedom (DOF) and 6 degrees of freedom (DOF) content generation, according to an embodiment of the disclosure.

FIG. 4 illustrates a method 400 for 3 degrees of freedom (3 DOF) and 6 degrees of freedom (6 DOF) content generation, according to an embodiment of the disclosure.

Referring to FIG. 4, the method 400 comprises of downloading a media presentation description (MPD) file for playback initially by a client at operation 402. After the MPD file is downloaded, any change in user body motion is detected whether it is translational or rotational at operation 404. In case translational motion is detected at operation 406, the operations 408B-422B are implemented for 6 DOF content generation. The communication bandwidth of the immersive device 200A is calculated after which a field of view (FOV) is calculated based on body movement and the type of motion is calculated using the 6 DOF motion calculator (not shown). The coordinates of different viewpoints covered by the user and the coordinates of the extended ROI rectangle are calculated for each viewpoint after determination of above parameters such as bandwidth, FOV and the type of motion. After this, the multidimensional media buffering mechanism is enabled and the optimal set of tiles that fall within the ROI of each viewpoint using SRD information of the MPD file supplied by the server (not shown) is determined and the HTTP URLs are being extracted for these respective tiles. The server is then finally requested by client to provide the tile set. In case translational motion is not detected, the operations 408A-418A are implemented for 3 DOF content generation or solution. The bandwidth of the client is calculated after which FOV of the client is calculated based on the 3 DOF FOV calculator module (not shown) based on body movement and type of motion is calculated using 3 DOF motion calculator (not shown). The coordinates of the extended ROI rectangle are calculated and the optimal set of tiles that fall within the ROI using SRD information of the MPD file supplied by the server is determined and the HTTP URLs are being extracted for these respective tiles. The server is then finally requested by client to provide the tile set.

Figure 5A:
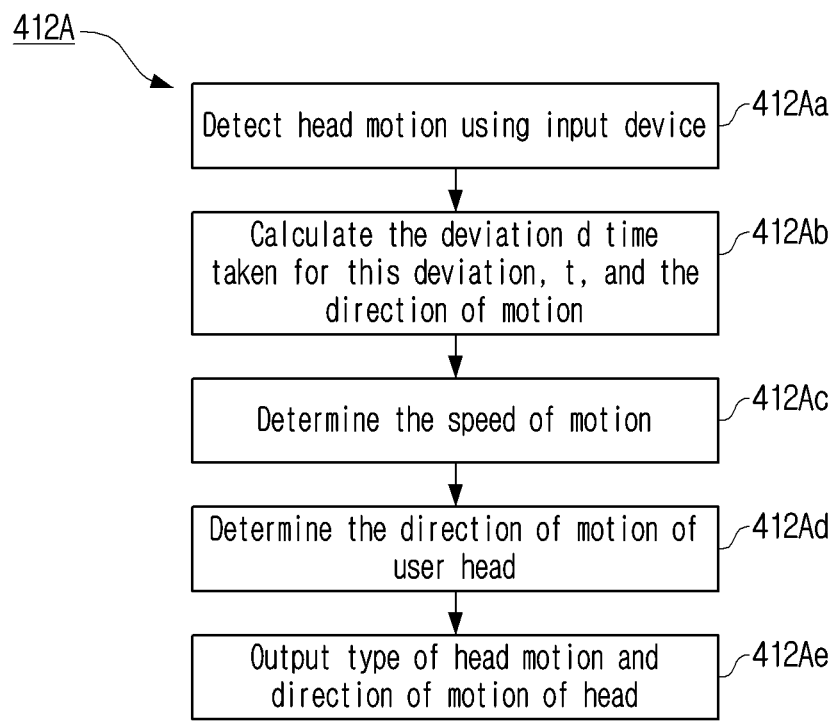
FIG. 5A illustrates a method flow diagram for motion calculation in 3 DOF applications, according to an embodiment of the disclosure.
Figure 5B:
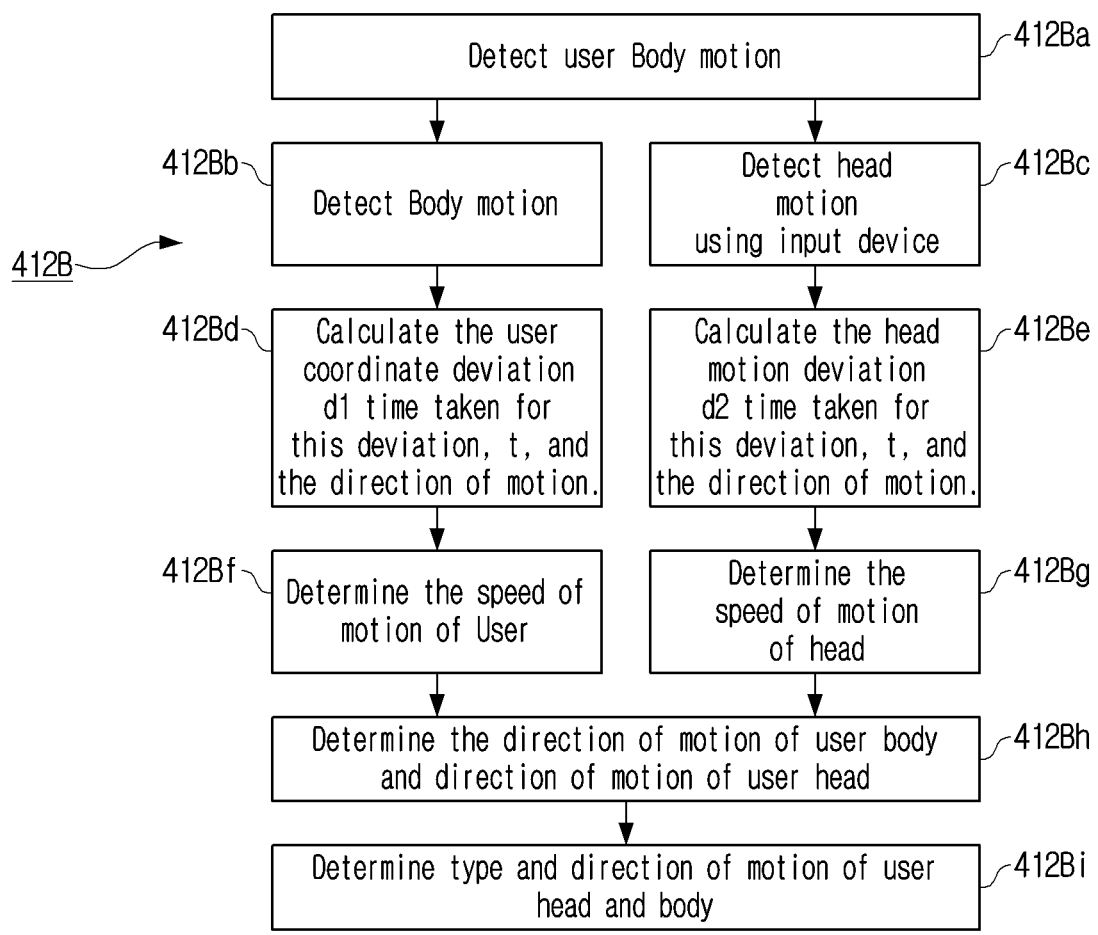
FIG. 5B illustrates a method flow diagram for motion calculation in 6 DOF applications, according to an embodiment of the disclosure.

FIGS. 5A and 5B illustrate method flow diagrams 412A and 412B for motion calculation in 3 DOF and 6 DOF applications, according to various embodiments of the disclosure.

Referring to FIGS. 5A and 5B, in case of motion calculation in 3 DOF applications the method comprises of detecting the user head motion using an immersive device at operation 412Aa. The deviation, the time taken for the deviation and direction of motion is calculated after detection of head motion at operation 412Ab. The speed of the motion is then determined after calculation of above mentioned parameters at operation 412Ac. The direction of motion of user head is determined at next step and finally the type of head motion and direction of head motion is calculated and sent as output at operations 412Ad and 412Ae. In case of motion calculation in 6 DOF applications the method comprises of detecting the user head and body motion using an immersive device at operations 412Ba-412Bc. The user co-ordinate deviation, time taken for this deviation, and the direction of motion upon body motion detection and the user co-ordinate deviation, time taken for this deviation, and the direction of motion upon head motion detection are calculated and then the speeds of the motion of user body and user head are determined at operations 412Bd, 412Be, 412Bf and 412Bg. The direction of motion of user body and direction of motion of user head are calculated after determining the speeds of the motion of user body and user head at operation 412Bh. Lastly the type of head and body motion and direction of the head and body motion is calculated and sent as output at operation 412Bi.

Figure 6:
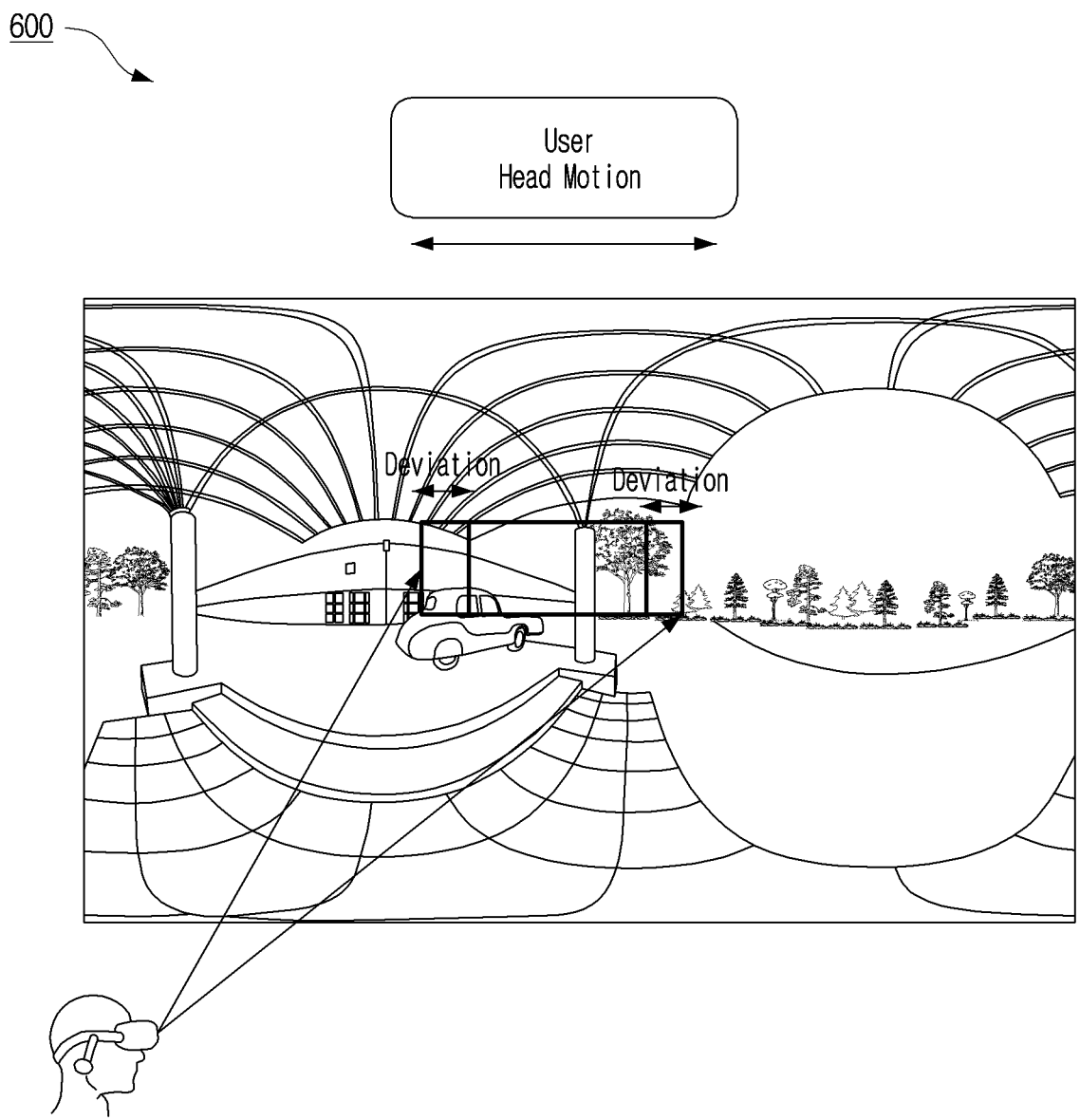
FIG. 6 illustrates motion tracking in 3 DOF, according to an embodiment of the disclosure.

FIG. 6 illustrates motion tracking 600 in 3 DOF, according to an embodiment of the disclosure.

Referring to FIG. 6, for a VR user a complete immersive VR experience can be achieved by providing: head Movement (Rotational movement 3DOF) of the user wherein the user can choose the portion of the spherical content to view by rotating the head to a specific direction. In the translation movement of user the user can fully navigate the scene by virtually moving within it. VR applications allow rotations and translations inside a virtual scene which are referred to as six degrees of freedom applications.

Figure 7:
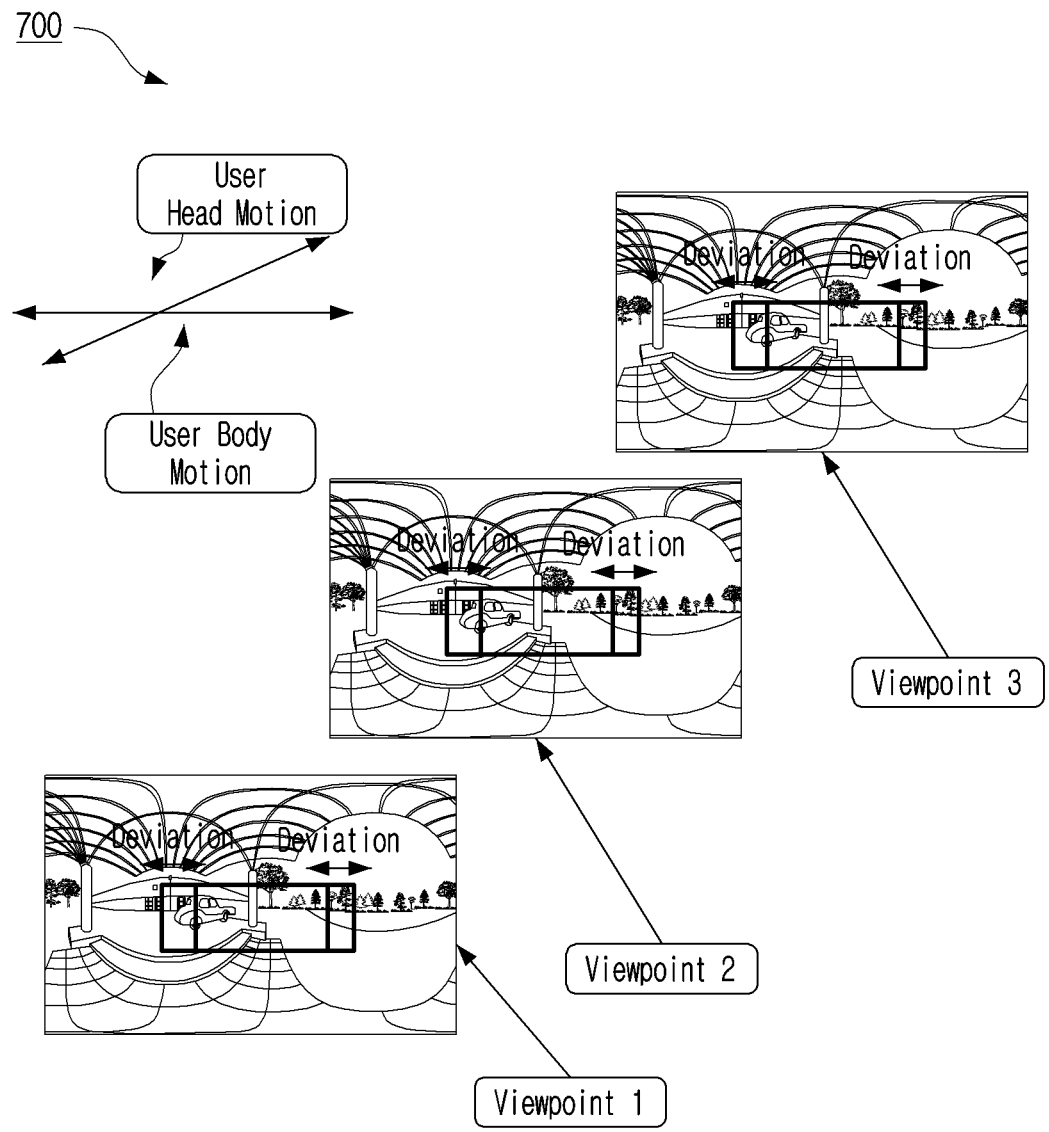
FIG. 7 illustrates motion tracking in 6 DOF, according to an embodiment of the disclosure.

Referring to FIG. 7, 6 DOF content 700 can be generated by keeping multiple camera at different positions which create different viewpoints relative to the camera positions. As each viewpoint is omnidirectional content, hence rotational and translation motion experience can be provided to user, which enhances the virtual reality experience. Latency is the biggest issue with 6 DOF content playbacks, as new content is loaded after detecting the user position change. If multiple viewpoints are downloaded the 6 DOF content playbacks has high bandwidth requirement. The proposed disclosure reduces the latency problem of 6 DOF by downloading the multi-view point data in case of user movement and as it uses a tiling technique bandwidth requirement as this solution which is way lesser than traditional approach. The method can be used to automatically switch to 3 DOF version of solution in case system does not detect any translational motion from user, which again improves user experience and further enhances it in an effective manner.

In some embodiments, dynamic ROI calculation is performed in case of objects with 6 DOF.

FIG. 7 illustrates an embodiment of dynamic ROI calculation in case of objects with 6 DOF, according to an embodiment of the disclosure. Wherein 6 DOF considers user body movement as well as user head motion to calculate the dynamic ROI and streams high second quality media content in calculated ROI. 6 DOF can be easily streamed using MPEG-DASH content where we represent each viewpoint with different adaptation set which has different representation for each tile data.

Figure 8:
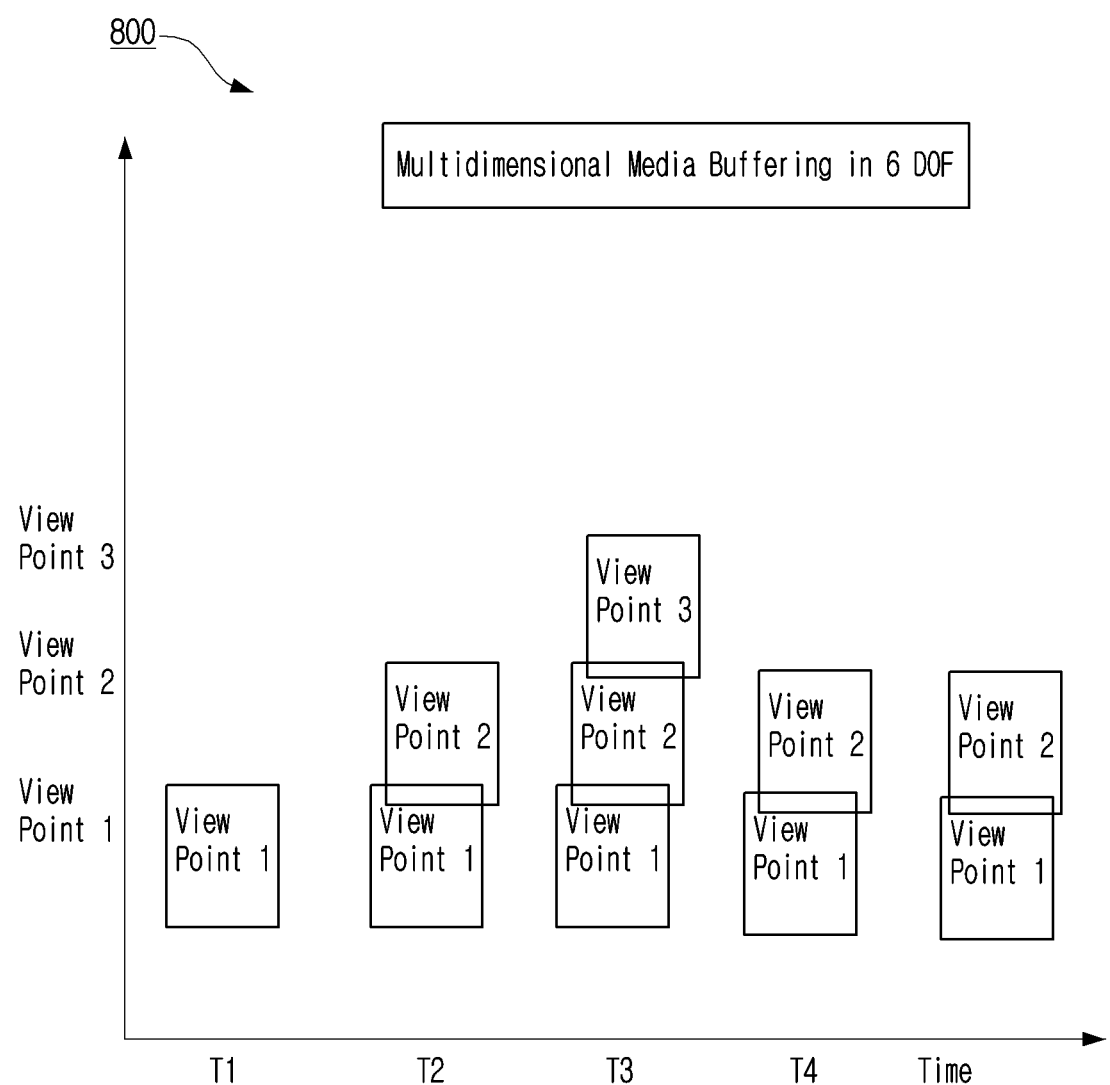
FIG. 8 illustrates a graphical representation of multidimensional media buffering in 6 DOF, according to an embodiment of the disclosure.

FIG. 8 illustrates a graphical representation 800 of multidimensional media buffering in 6 DOF, according to an embodiment of the disclosure.

Referring to FIG. 8, depending upon user body motion the depth of the media buffering pipeline is decided in which different viewpoints of the ROI of an object is calculated at different time intervals as represented. The proposed disclosure includes a multidimensional buffering module which will download the data of multiple viewpoints depending upon user translational movement.

Figure 9A:
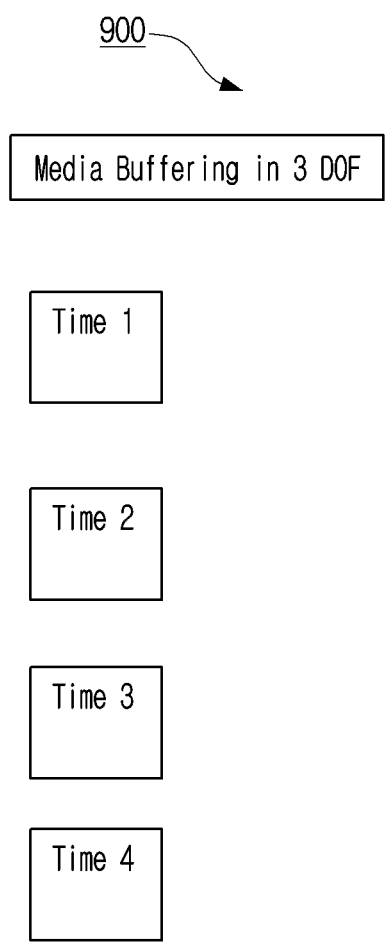
FIG. 9A illustrates a graphical representation 900 of media buffering in 3 DOF with respect to space versus time, according to an embodiment of the disclosure.
Figure 9B:
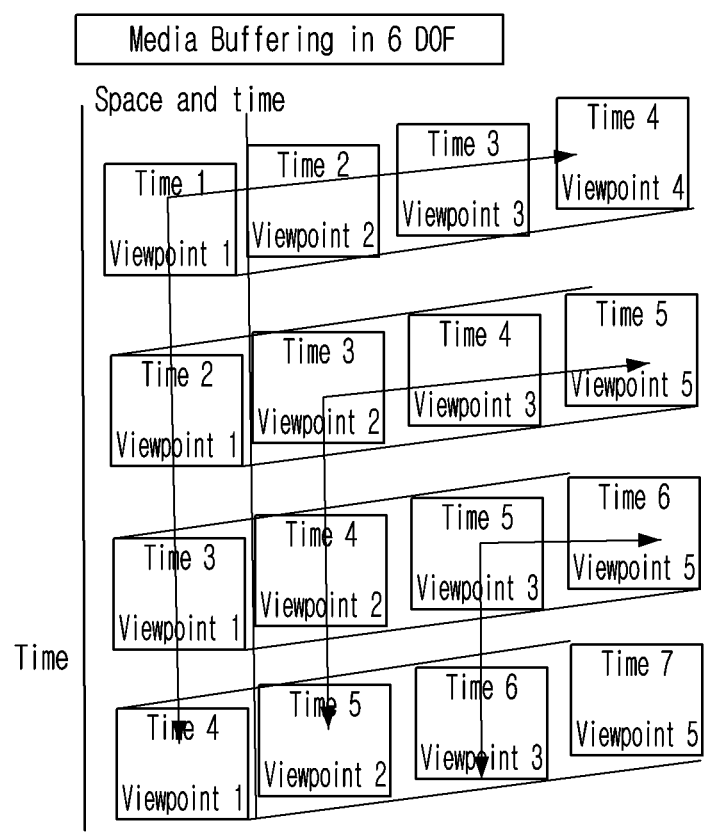
FIG. 9B illustrates a graphical representation of media buffering in 6 DOF with respect to space versus time, according to an embodiment of the disclosure.

FIGS. 9A and 9B illustrate graphical representation of media buffering in 3 DOF and 6 DOF with respect to space versus time, according to various embodiments of the disclosure.

Referring to FIGS. 9A and 9B, depending upon user body motion, the depth of the media buffering pipeline is decided. For e.g. if user is moving slow then buffer pipeline with respect to different viewpoints is shorter. In case of fast linear movement pipeline size is bigger. Size of the FOV for particular viewpoint are also increased or decreased depending on user motion.

Figure 10:
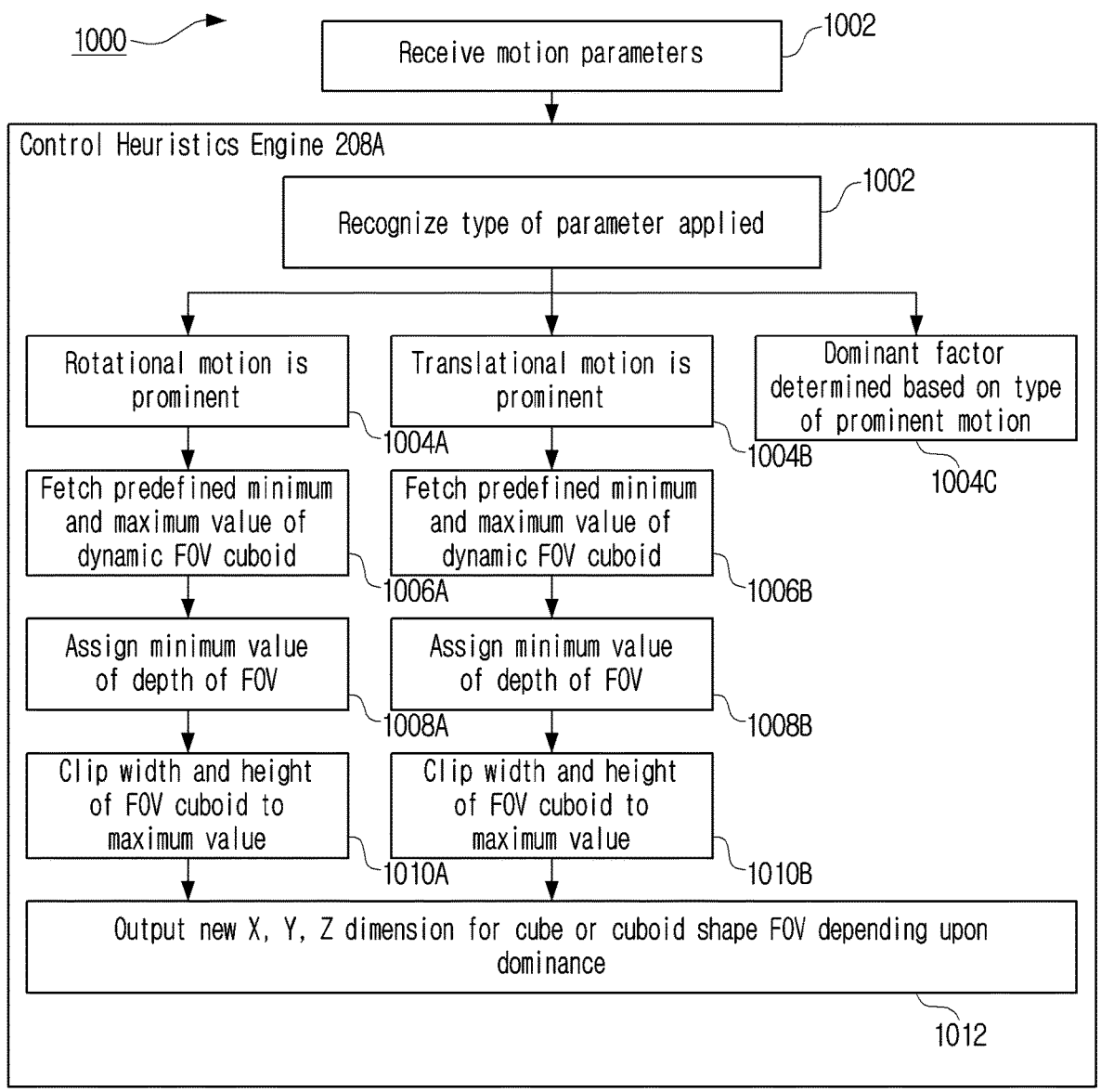
FIG. 10 illustrates a method for dynamic ROI calculation based on user's dominance, according to an embodiment of the disclosure.

FIG. 10 illustrates a method 1000 for dynamic ROI calculation based on user's dominance, according to an embodiment of the disclosure.

Referring to FIG. 10, the method 1000 comprises calculating ROI of an object using the control heuristics engine 208A comprising operations 1002-1012 that include receiving motion parameters, detecting head motion and body motion of the client for calculation of the client FOV of suitable depth, width and height, calculating the dominant factor based on the head motion or the body motion more prominent in the client behavior; and outputting new dimensions for the client FOV depending upon the calculated dominant factor. If the head movement is prominent the predefined minimum and maximum value of the client FOV is fetched, the depth of the client FOV is assigned minimum value and the width and the height of the client FOV is clipped to maximum value. Further, if the body movement is prominent: the predefined minimum and maximum value of the client FOV is fetched, the minimum value is assigned to the width and the height of the client FOV and the depth of the client FOV is clipped to maximum value.

Figure 11:
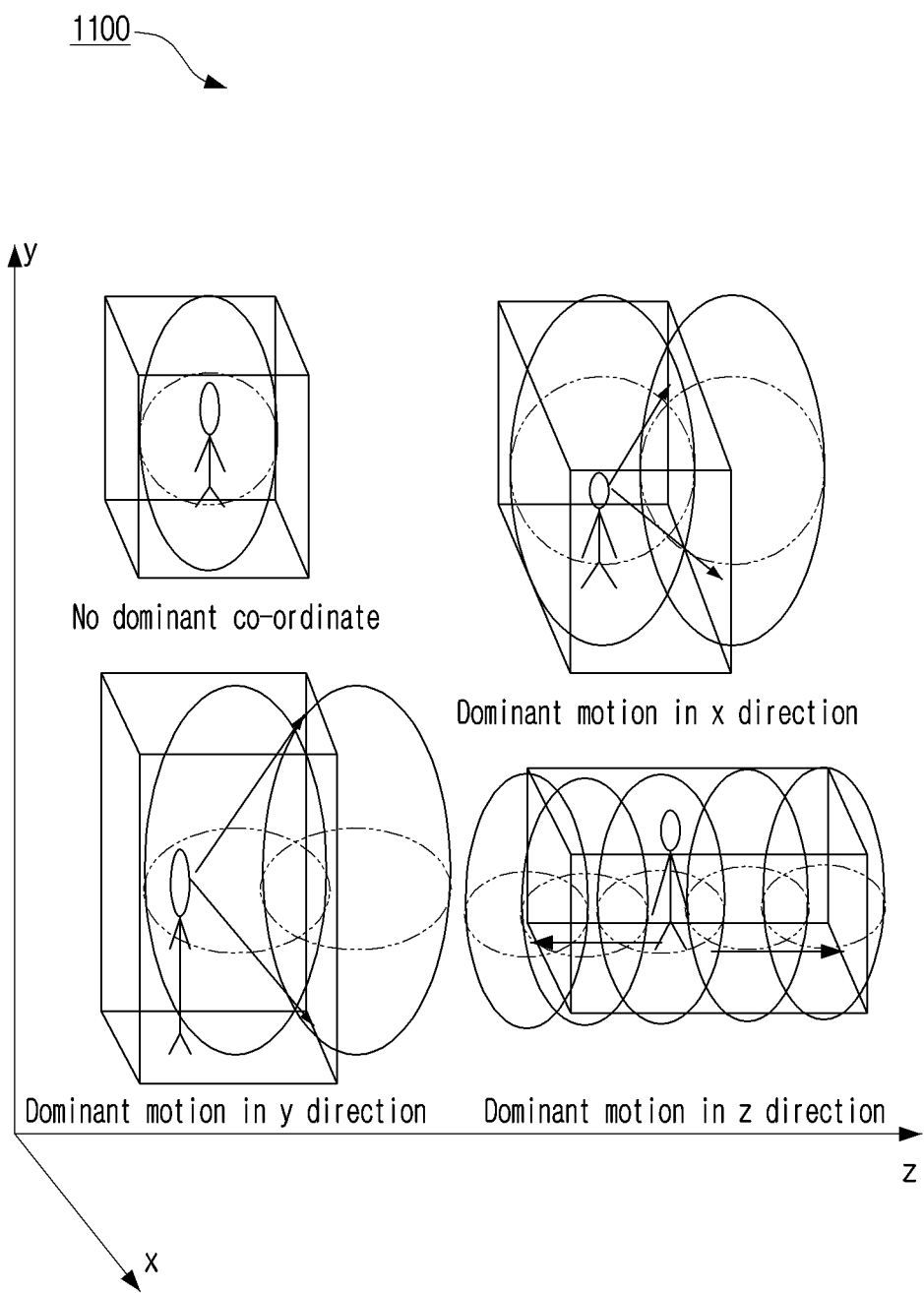
FIG. 11 illustrates a cuboid ROI calculation based on user's dominant motion, according to an embodiment of the disclosure.

FIG. 11 illustrates cuboid ROI calculation 1100 based on user's dominance in 3D, according to an embodiment of the disclosure.

Referring to FIG. 11, new FOV is calculated where all the three dimension values come in the predefined range of their respective dimension if not then the dimension which is dominant provides the maximum possible range value. A new cuboid dimension is supplied as the dynamic region of interest to subsequent module. Let X and Y represent the horizontal and vertical axis which is connected based on predefined Aspect ratio, for e.g. if the Aspect ratio of ROI is 4/3, then X/Y=4/3; and Z dimension is dependent upon the translation motion of body which will decide how many different viewpoint content should be downloaded in parallel. If Z is dominant then X and Y will be taken as minimum value. For e.g. if X is dominant and if the value of X is d {if Xmin<d<Xmax then X=d and Y=¾*d else X=Xmax and Y=¾*Xmax and Z is mapped to Z=Zmin}. Similarly for Y as well, if Z is dominant {if Zmin<d<Zmax then Z=d and x=Xmin and y=Ymin else Z=Zmax and X=Xmin and Y=Ymin}.

In some embodiments, the proposed disclosure implementation is mostly at the client level (immersive device 200A) but the same solution can be easily implemented at server end (immersive device 200B) where user motion and bandwidth information can be shared with server and server modifies the content as per user supplied parameter.

Figure 12:
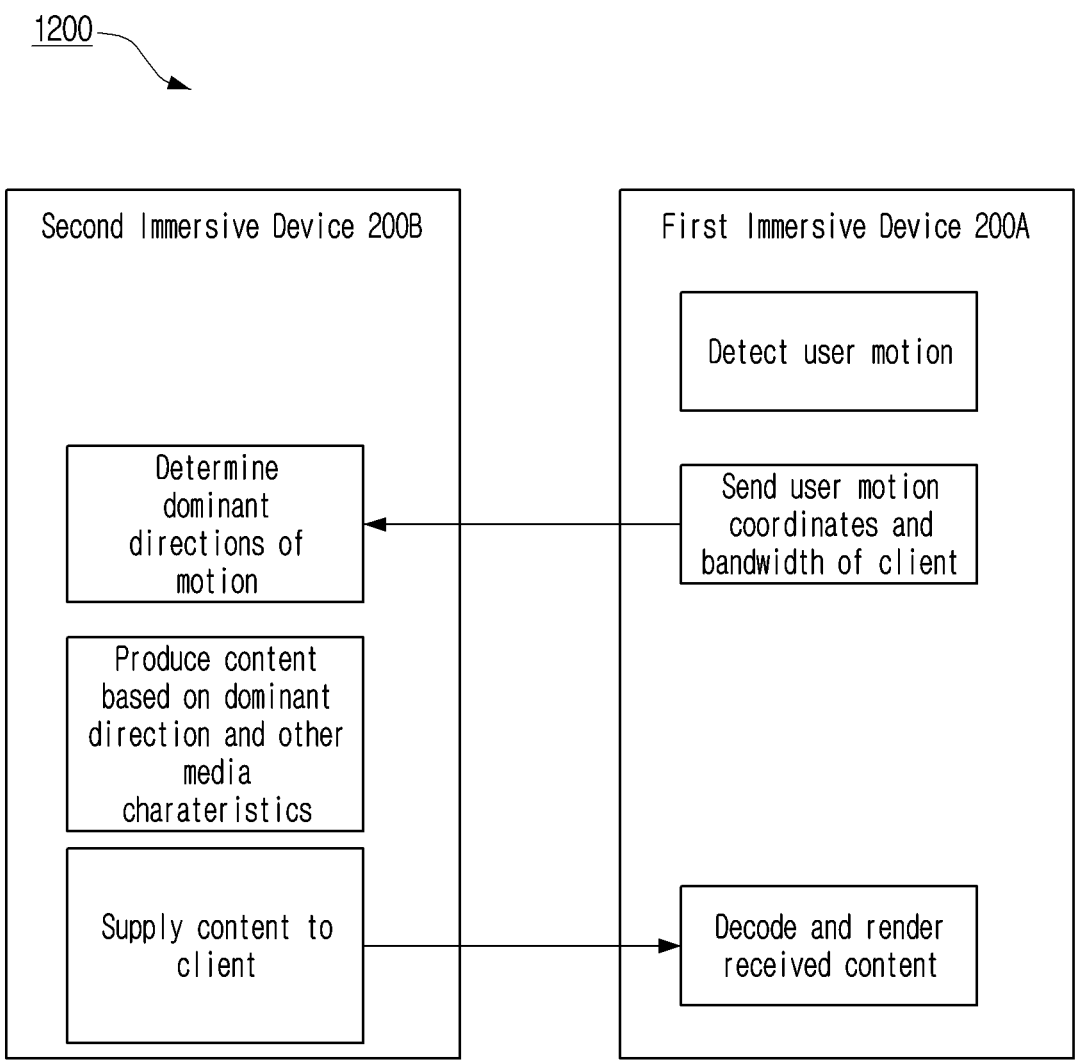
FIG. 12 illustrates client-server interaction for streaming of immersive media, according to an embodiment of the disclosure.

FIG. 12 illustrates one such particular embodiment of the client-server interaction 1200 for adaptive streaming of mixed reality media according to an embodiment of the disclosure.

Referring to FIG. 12, initially a user's motion is detected and based on the user's rotational or translational or both movements simultaneously, the coordinates of user's movement and the bandwidth of the user is calculated which is sent to the server by the client. The server determines the dominant directions of movement in three dimensional space and produces the content based on dominant direction and other media characteristics. The produced content is supplied to the client. The content is then decoded by the client device and the client receives the final required frame.

Figure 13:
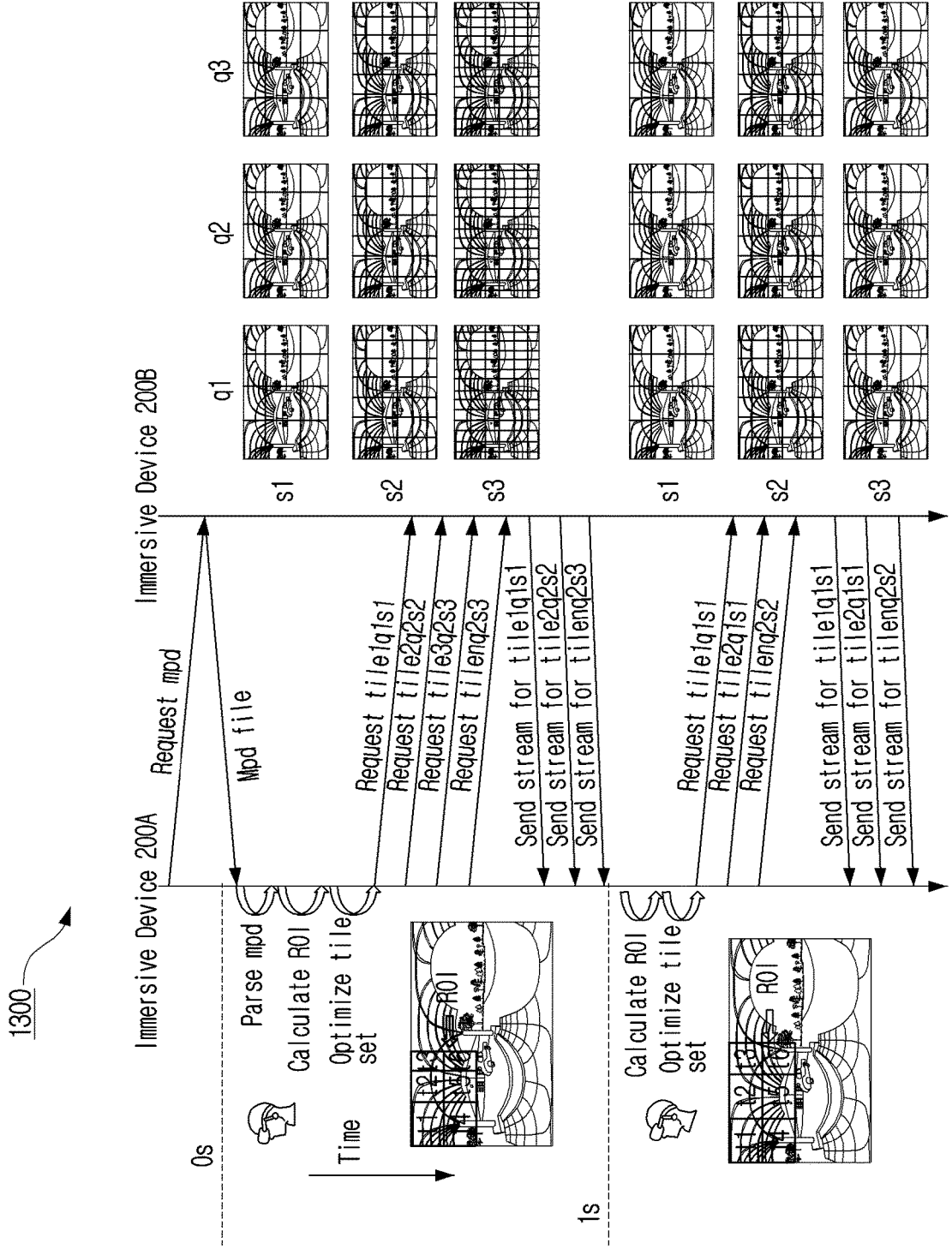
FIG. 13 illustrates a timing diagram with respect to client-server interaction for adaptive streaming of immersive media, according to an embodiment of the disclosure.

FIG. 13 illustrates an embodiment of the system 1300 involving client-server interaction based method implementation for adaptive streaming of immersive media, according to an embodiment of the disclosure.

Referring to FIG. 13, the system involving client-server interaction based method implementation for adaptive streaming of immersive media in FIG. 13 comprises of a head motion tracker (not shown), a dynamic ROI generator (not shown), a tile set optimizer (not shown), an adaptive VR streaming executor (not shown), an image requestor (not shown) and a server (not shown). The head tracker detects and tracks the head motion of the user. The dynamic generation module adaptively increases or decreases the ROI with respect to the current FOV based on user motion, and is not generated as a separate region. An additional tile set optimizer module is capable of handling multiple sized tiles and then determining the best possible set as per calculated ROI, thus providing a better accuracy in optimizing quality in the user's ROI. The adaptive VR streaming executor executes the VR streaming requested from the server by adjusting it according to user's requirements and the image requestor processes this adjusted VR streaming and requests to provide the image of the VR streaming.

The tile quality engine 208 adaptively increases or decreases the ROI with respect to the current FOV based on user motion, and is not generated as a separate region. In the suggested method, the size of the ROI is dynamically increased or decreased based on the speed of head motion of the user. This region is not downloaded as separate area but is extended from the field of view itself. For static speed and direction of motion, ROI=area under FOV; for linear speed and direction of motion, ROI=Area under FOV+extended region, where, Extended region=2*(deviation angle*pixels per angle). For fast speed and direction of motion, ROI=Complete frame (frame quality can be based on bandwidth limitations if any).

In some embodiments, a normal Hyper Text Transfer Protocol (HTTP) apache server is required for this solution to keep the tile based generated content or segment and an MPD file to represent the available content. A client and server interaction is based on HTTP standard protocol and no changes are done at server side. An HTTP request for playlist is being initiated by the client to server for obtaining MPD file. The client receives MPD file from the server and parses it. The server calculates bandwidth, field of view and type of user motion and this repeats every 1 second. The tiles are selected based on the bandwidth, FOV and type of motion of the user. An HTTP request is sent to server by the client for selected tiles for video streaming. The client receives selected tiles from the server. The received tiles from the server are stitched to make a media frame for e.g. a video frame. This stitched media frame i.e. video frame is sent to a decoder and render module and after analyzing and decoding the final media frame is rendered to the client by the server. As Multimedia streaming protocol i.e. MPEG-DASH is used which is based on HTTP protocol, and since devices already support this standard for media streaming there is no compatibility problem.

In some embodiments, adaptive streaming of mixed reality media is achieved through client-server interaction. MPEG-DASH is the standard protocol used in client and server interaction. As MPEG Dash tile based streaming is supported by OMAF (Omnidirectional Media Format) standard, VR industry is very aggressively adapting these standards for development of VR streaming solution and also suggesting enhancements to present standards. Hence, our proposed solution is also based on tile based VR streaming based on OMAF standard which is an enhancement for OMAF based VR streaming. MPEG DASH media streaming supply MPD (Media Presentation Description) file to client, so client will know all the available streams at server and depending upon client heuristics client can request any media stream from server. Basic OMAF DASH streaming procedure involves obtaining of MPD by the client. The client then obtains the current viewing orientation and gets the estimated bandwidth after obtainment of MPD. The client chooses the Adaptation set(s) and the Representation(s), and requests the (Sub) Segments to match the client's capabilities, including OMAF-specific capabilities, and to maximize the quality, under the network bandwidth constraints, for the current viewing orientation. The client obtains the current viewing orientation and gets the estimated bandwidth. The client chooses the Adaptation Set(s) and the Representation(s), and requests the (Sub) Segments to match the client's capabilities, incl. OMAF-specific capabilities, and to maximize the quality, under the network bandwidth constraints, for the current viewing orientation.

Tiled sizes support is supported by the MPEG-DASH standard by Spatial Representation Description (SRD) through MPD file, which is provided to client by server, so once client receives this file client will know all the information of media streams and also the tiling information (x, y co-ordinate, width and height of each tile).

Figure 14:
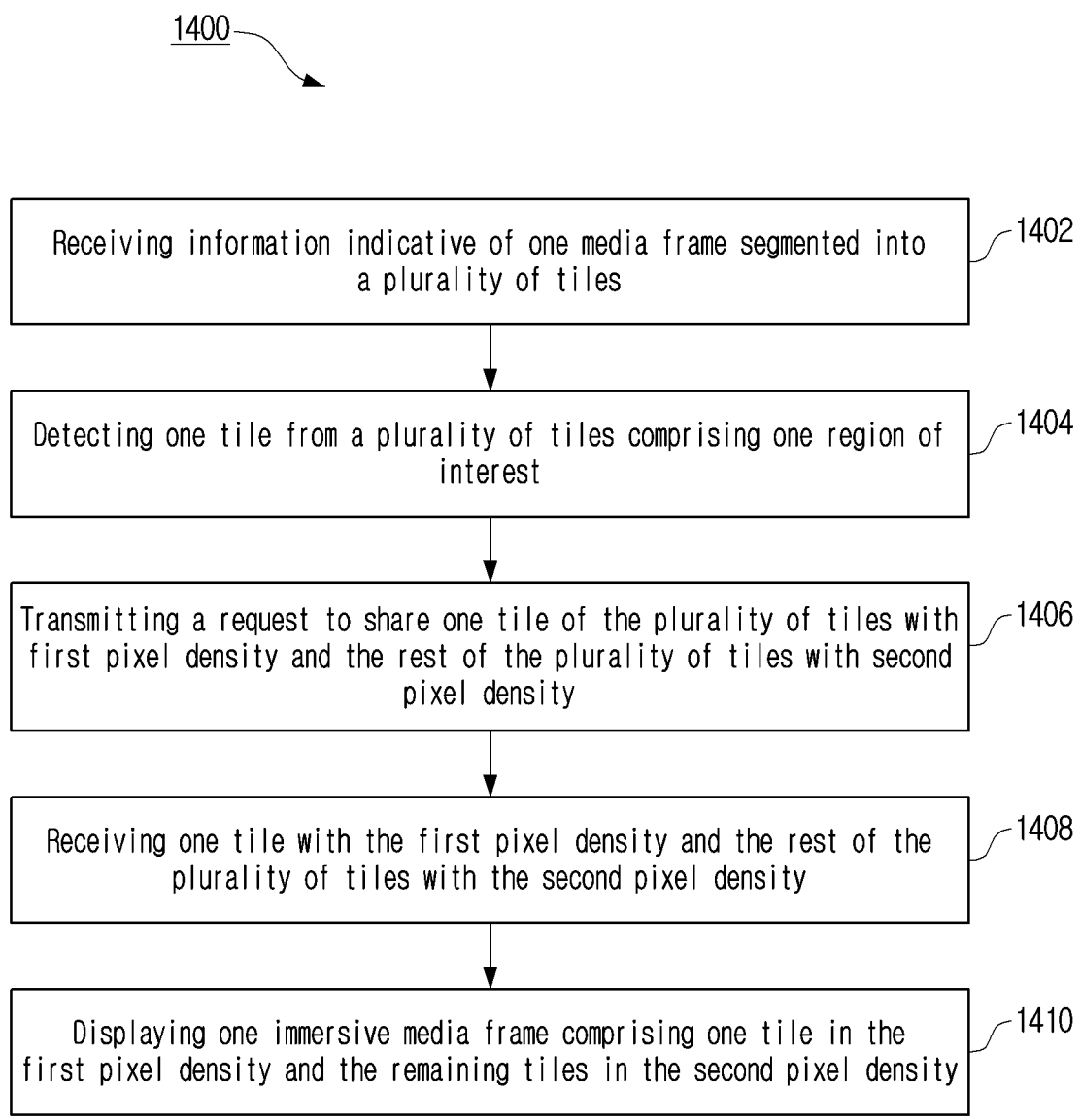
FIG. 14 illustrates a block diagram of the method for streaming of immersive media using one immersive device according to an embodiment of the disclosure.

FIG. 14 illustrates a block diagram of the method 1400 for streaming of immersive media using first immersive device 200A.

Referring to FIG. 14, the first immersive device 200A receives information indicative of one media frame segmented into a plurality of tiles at operation 1402. One tile from a plurality of tiles is detected by the first immersive device 200A comprising one region of interest at operation 1404. A request to share one tile of the plurality of tiles with first pixel density and the rest of the plurality of tiles with second pixel density is transmitted to the first immersive device at operation 1406. A tile with the first pixel density and the rest of the plurality of tiles with the second pixel density is received by the first immersive device at operation 1408 wherein the first pixel density is higher than the second pixel density. One immersive media frame comprising one tile in the first pixel density and the remaining tiles in the second pixel density are displayed finally at operation 1410.

Figure 15:
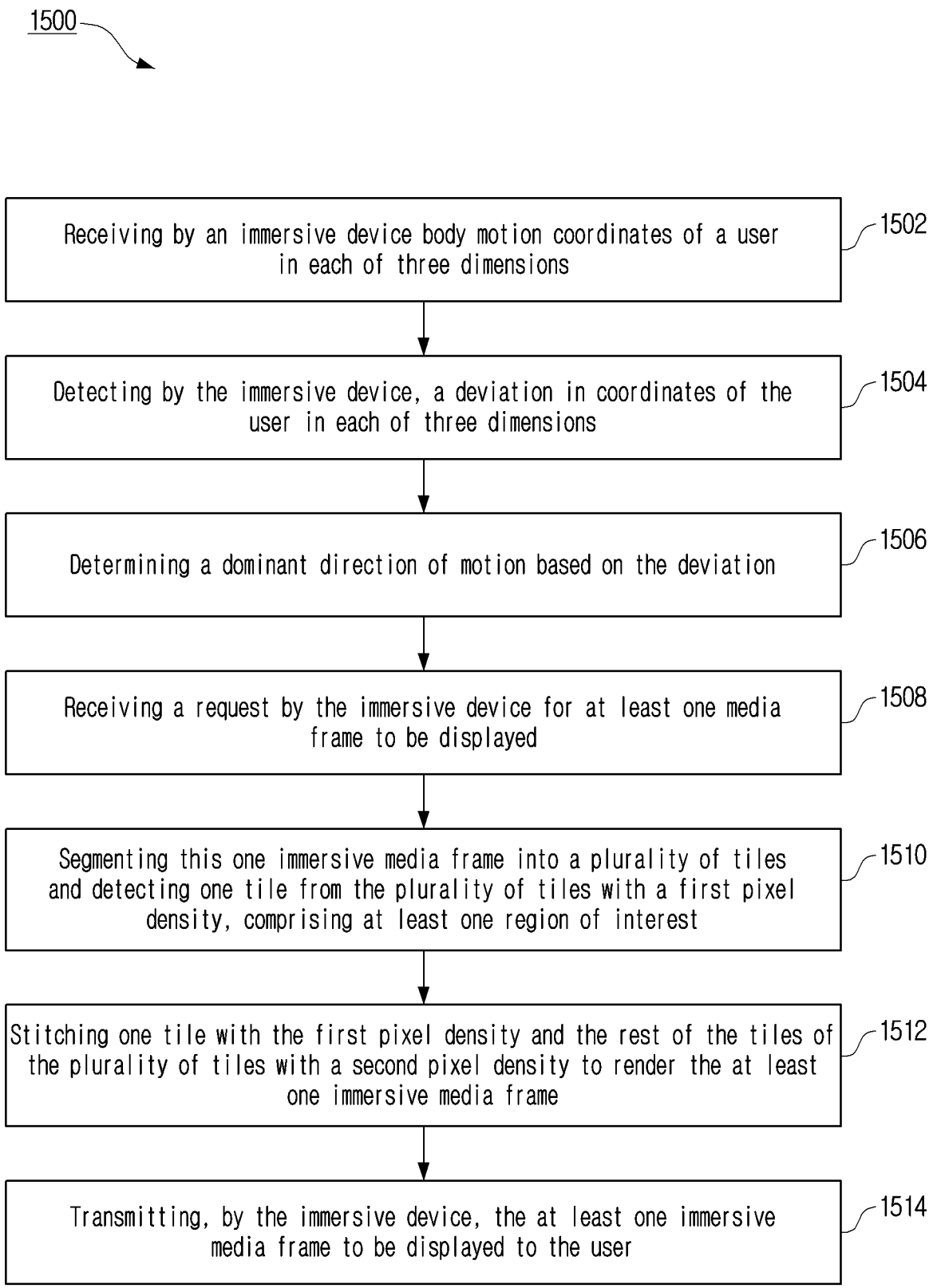
FIG. 15 illustrates a block diagram of the method for streaming of immersive media using two immersive devices according to an embodiment of the disclosure.

FIG. 15 illustrates a block diagram of a method 1500 for streaming of immersive media using two immersive devices, that is, a first immersive device 200A and a second immersive device 200B.

Referring to FIG. 15, the body motion coordinates of a user in each of three dimensions is firstly received by the first immersive device 200A at operation 1502. A deviation in coordinates of the user in each of three dimensions is then detected by the first immersive device 200A at operation 1504. The dominant direction of motion based on the deviation calculated at operation 1504 is then determined at operation 1506. A request by the first immersive device 200A for at least one media frame to be displayed is received by the second immersive device 200B at operation 1508. The received request is processed by the second immersive device 200B and the media frame to be displayed is segmented into a plurality of tiles by the second immersive device 200B at operation 1510. One tile with the first pixel density and the rest of the tiles of the plurality of tiles with a second pixel density are stitched by the second immersive device 200B to render one immersive media frame at operation 1512 wherein the first pixel density is higher than the second pixel density. This immersive media frame is transmitted by the second immersive device 200B to the first immersive device 100 to be displayed to the user at operation 1514.

Figure 16:
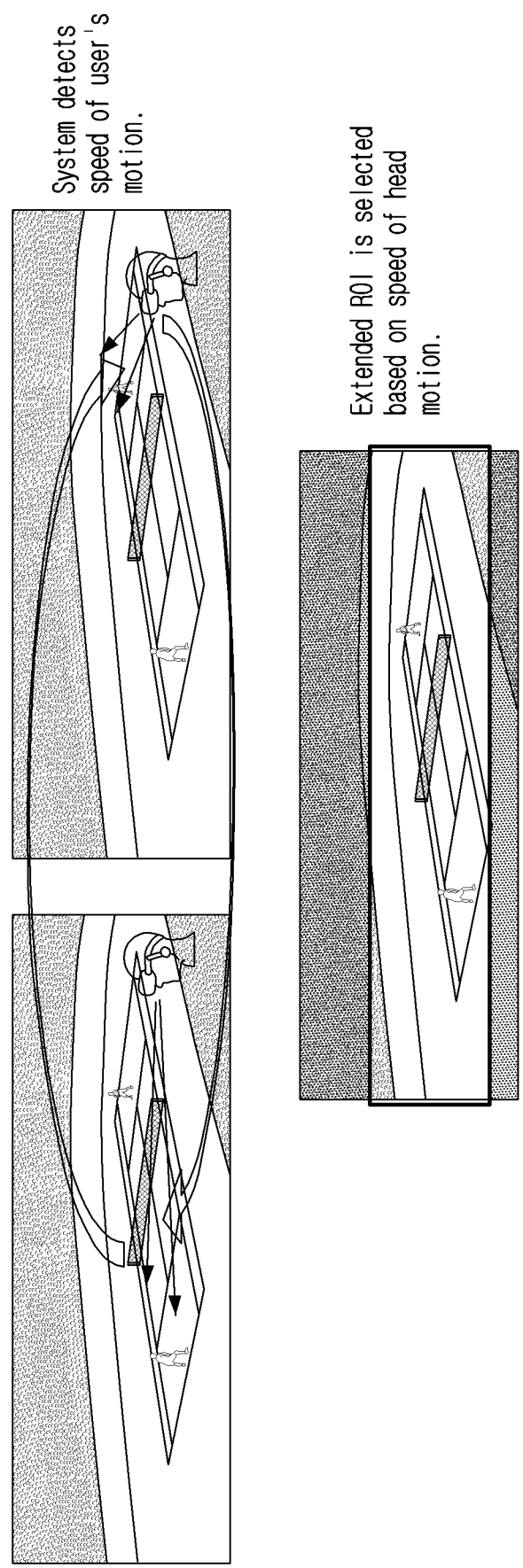
FIG. 16 illustrates a screenshot of the scenario involving selection of ROI based on speed of user's motion, according to an embodiment of the disclosure.

FIG. 16 illustrates a screenshot 1600 of the scenario involving selection of ROI based on speed of user's motion, according to an embodiment of the disclosure.

Referring to FIG. 16, the system detects speed of user's head motion and extended ROI is selected based on speed of user's head and body motion.

In some embodiments, the proposed disclosure can be easily extended for augmented reality scenarios as well, as augmented reality environment can be easily cluttered with lot of virtual objects if it is just statically based on user FOV, which can lead to unnecessary load on system to show graphical object.

Figure 17:
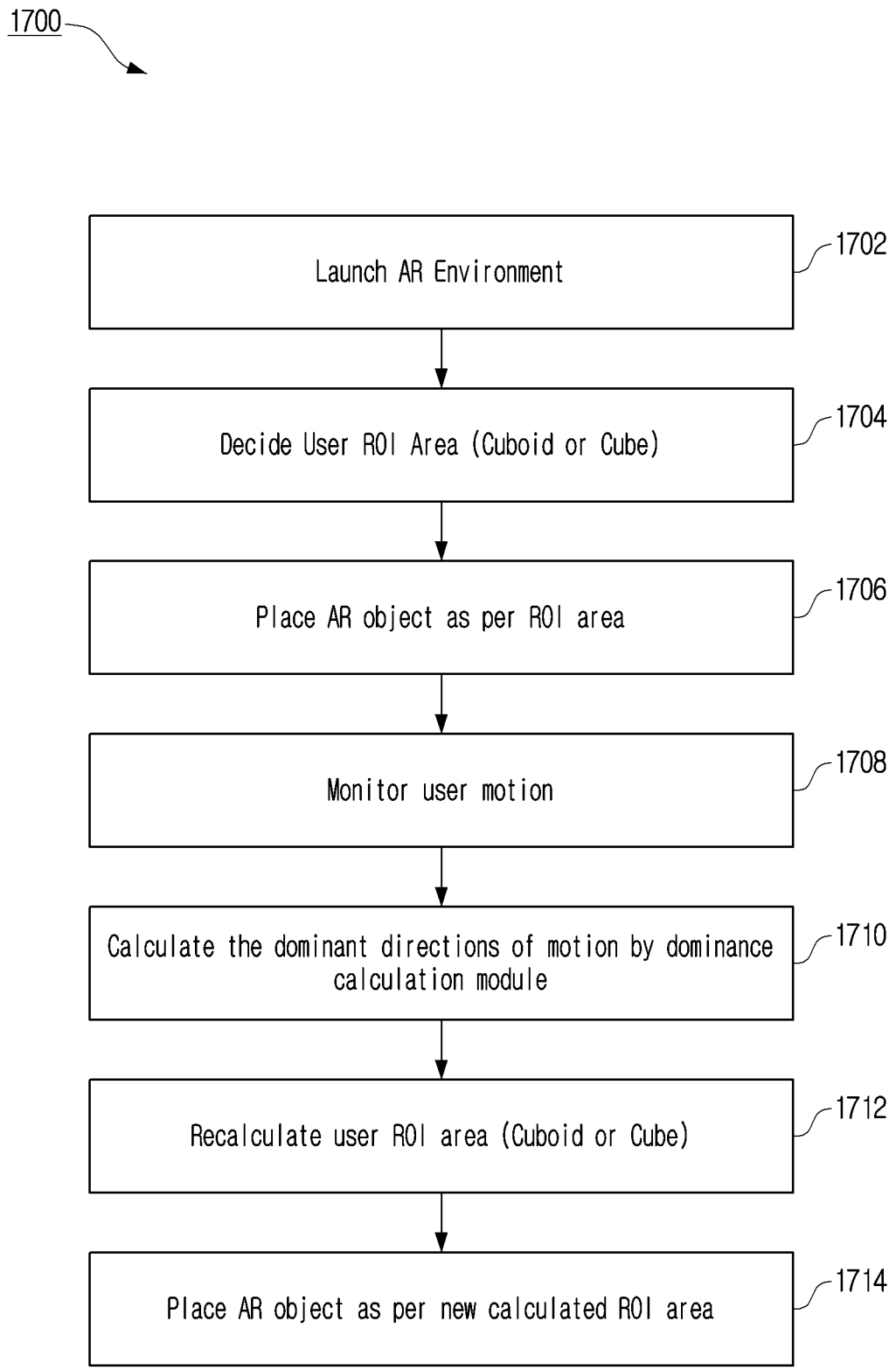
FIG. 17 illustrates an embodiment of the method flow diagram for adaptive streaming of augmented reality media, according to an embodiment of the disclosure.

FIG. 17 illustrates a method 1700 for calculating user effective dynamic ROI based on user's motion, according to an embodiment of the disclosure.

Referring to FIG. 17, an augmented reality (AR) environment is launched at operation 1702. At operation 1704, the user's ROI area is decided based on their calculated motion coordinates. An AR object is then placed as per calculated ROI area at operation 1706. The user motion is being monitored after placing of AR object at operation 1708. The dominant directions of the user's motion are again calculated by way of dominance calculation module at operation 1710. The user's ROI area is recalculated based on user's dominance determination at operation 1712. An AR object is again placed as per new recalculated ROI area at operation 1714.

The various actions, acts, blocks, operations, or the like in the FIGS. 1 to 17 may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for streaming of immersive media, the method comprising:
   receiving, by an immersive device, information indicative of at least one media frame segmented into a plurality of tiles;
   detecting, by the immersive device, at least one tile from the plurality of tiles, comprising at least one region of interest;
   transmitting, by the immersive device, a request to share based on a bandwidth of the immersive device, wherein the request to share comprises:
   the at least one tile from the plurality of tiles with the first pixel density, and
   a remainder of the plurality of tiles with a second pixel density based on the bandwidth of the immersive device, the first pixel density being higher than the second pixel density;
   receiving, by the immersive device, the at least one tile with the first pixel density and the remainder of the plurality of tiles with the second pixel density; and
   controlling to display, by the immersive device, at least one immersive media frame comprising the at least one tile in the first pixel density and the remainder of the plurality of tiles in the second pixel density,
   wherein the transmitting of a request to share the at least one tile with the first pixel density based on the bandwidth of the immersive device comprises:
   determining a width of the at least one tile, a depth of the at least one tile and a height of the at least one tile based on the region of interest; and
   transmitting the width of the at least one tile, the depth of the at least one tile and the height of the at least one tile.

2. The method of claim 1, wherein the detecting of the at least one tile from the plurality of tiles, comprising at least one region of interest comprises:
   detecting at least one type of body motion of a user of the immersive device, the at least one type of body motion being at least one of a rotational motion of a body of the user or a translational motion of the body of the user;
   determining a deviation in coordinates of the user in each of three dimensions; based on the detected at least one type of body motion;
   determining a dominant direction of motion based on the deviation;
   dynamically assigning dimensions of the at least one region of interest based on the dominant direction of motion; and
   detecting the at least one tile from the plurality of tiles, comprising the at least one region of interest based on the dominant direction of motion.

3. The method of claim 1, wherein the transmitting of a request to share the at least one tile with the first pixel density based on the bandwidth of the immersive device comprises:
   determining a location of the at least one tile in the at least one immersive media frame; and
   transmitting the location of the at least one tile.

4. The method of claim 1, wherein the at least one immersive media frame includes at least one of virtual reality media frames or augmented reality media frames.

5. The method of claim 1, wherein the at least one tile comprises at least one virtual object.

6. The method of claim 1, wherein the controlling to display of the at least one immersive media frame comprising the at least one tile in the first pixel density and the remainder of the plurality of tiles in the second pixel density comprises:
   stitching the at least one tile with the first pixel density and the remainder of the plurality of tiles with the second pixel density to render at least one immersive media frame; and
   controlling to display the at least one immersive media frame.

7. A method for streaming of immersive media, the method comprising:
   receiving, by an immersive device, body motion coordinates of a user in each of three dimensions;
   detecting, by the immersive device, a deviation in coordinates of the user in each of three dimensions;
   determining, by the immersive device, a dominant direction of motion based on the deviation;
   receiving, by the immersive device, a request for at least one immersive media frame to be displayed;
   segmenting, by the immersive device, the at least one immersive media frame, among a plurality of immersive media frames, into a plurality of tiles;
   dynamically detecting, by the immersive device, at least one tile from the plurality of tiles, comprising at least one region of interest;
   stitching, by the immersive device, the at least one tile from the plurality of tiles with a first pixel density and a remainder of the plurality of tiles with a second pixel density to render the at least one immersive media frame; and
   transmitting, by the immersive device, the at least one immersive media frame to be displayed to the user,
   wherein the dynamically detecting at least one tile from the plurality of tiles, comprising at least one region of interest comprises:
   determining the first pixel density based on a communication bandwidth;
   determining a width of the at least one tile, a depth of the at least one tile and a height of the at least one tile based on the region of interest; and
   transmitting the width of the at least one tile, the depth of the at least one tile and the height of the at least one tile.

8. The method of claim 7, wherein the dynamically detecting of at least one tile from the plurality of tiles, comprising at least one region of interest comprises determining a location of the at least one tile in the at least one immersive media frame.

9. The method of claim 7, wherein the plurality of immersive media frames include one of virtual reality media frames and augmented reality media frames.

10. The method of claim 7, wherein the at least one tile includes at least one virtual object.

11. The method of claim 7, wherein the segmenting the at least one immersive media frame into a plurality of tiles comprises:
    receiving the at least one immersive media frame from a media source; and
    segmenting the at least one immersive media frame into a plurality of tiles.

12. An immersive device for streaming of immersive media, the immersive device comprising:
    a transceiver for receiving information indicative of at least one immersive media frame segmented into a plurality of tiles;

a memory, communicably coupled to the transceiver, storing the received information indicative of the at least one immersive media frame segmented into the plurality of tiles; and a tile quality engine communicably coupled to the transceiver and the memory, the tile quality engine configured for:

detecting at least one tile from the plurality of tiles, comprising at least one region of interest, transmitting a request via the transceiver to share:
    the at least one tile from the plurality of tiles with a first pixel density, and
    a remainder of the plurality of tiles with a second pixel density based on a bandwidth of the immersive device, the first pixel density being higher than the second pixel density, receiving the at least one tile with the first pixel density and the remainder of the plurality of tiles with the second pixel density through the transceiver, and controlling to display at least one immersive media frame comprising the at least one tile in the first pixel density and the remainder of the plurality of tiles in the second pixel density, wherein the transmitting of a request to share the at least one tile with the first pixel density based on the bandwidth of the immersive device comprises:

determining a width of the at least one tile, a depth of the at least one tile and a height of the at least one tile based on the region of interest; and transmitting the width of the at least one tile, the depth of the at least one tile and the height of the at least one tile.

13. The immersive device of claim 12, wherein the detecting of the at least one tile from the plurality of tiles, comprising at least one region of interest comprises:

detecting at least one type of body motion of a user of the immersive device, the at least one type of body motion being at least one of a rotational motion of a body of the user or a translational motion of the body of the user;

determining a deviation in coordinates of the user in each of three dimensions; based on the detected at least one type of body motion;

determining a dominant direction of motion based on the deviation;

dynamically assigning dimensions of the at least one region of interest based on the dominant direction of motion; and detecting the at least one tile from the plurality of tiles, comprising the at least one region of interest based on the dominant direction of motion.

14. The immersive device of claim 12, wherein the at least one immersive media frame comprises at least one of a mixed reality media frame, a virtual reality media frames or an augmented reality media frame.

15. The immersive device of claim 12, wherein the at least one tile comprises a fit, the at least one tile including at least one virtual object.

16. The immersive device of claim 12, wherein the controlling to display of the at least one immersive media frame comprising the at least one tile in the first pixel density and the remainder of the plurality of tiles in the second pixel density comprises:

stitching the at least one tile with the first pixel density and the remainder of the plurality of tiles with the second pixel density to render at least one immersive media frame; and controlling to display the at least one immersive media frame.

17. An immersive device for streaming of immersive media, the immersive device comprising:

a transceiver for receiving body motion coordinates of a user in each of three dimensions;

a memory, communicably coupled to the transceiver, storing the body motion coordinates of a user in each of three dimensions; and a tile quality engine communicably coupled to the transceiver and the memory configured for:

detecting a deviation in coordinates of a user of the immersive device in each of three dimensions;

determining a dominant direction of motion based on the deviation;

receiving a request through the transceiver for at least one immersive media frame, among a plurality of immersive media frames, to be displayed;

segmenting the at least one immersive media frame into a plurality of tiles;

dynamically detecting at least one tile from the plurality of tiles, comprising at least one region of interest;

stitching the at least one tile with a first pixel density and stitching a remainder of the plurality of tiles with a second pixel density to render the at least one immersive media frame; and transmitting the at least one immersive media frame to be displayed to the user through the transceiver, wherein the dynamically detecting at least one tile from the plurality of tiles, comprising at least one region of interest comprises:

determining the first pixel density based on a communication bandwidth;

determining a width of the at least one tile, a depth of the at least one tile and a height of the at least one tile based on the region of interest; and transmitting the width of the at least one tile, the depth of the at least one tile and the height of the at least one tile.

18. The immersive device of claim 17, wherein the first pixel density and the second pixel density are determined by motion deviation of the user and the communication bandwidth in relation to communication between the immersive device and another immersive device, and media sources.

19. The immersive device of claim 17, wherein after the communication bandwidth is determined, a field of view (FOV) of the user is determined based on body movement of the user.

20. The immersive device of claim 19, wherein a type of motion of the user is calculated using a six (6) degrees of freedom (DOF) motion calculator.

\* \* \* \* \*